(12) United States Patent
Tabata et al.

(10) Patent No.: US 11,970,084 B2
(45) Date of Patent: Apr. 30, 2024

(54) VEHICLE DRIVE DEVICE AND CONTROL METHOD FOR THE SAME

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Yuki Makino, Aichi-gun (JP); Akinori Homan, Toyota (JP); Yosuke Akiyama, Susono (JP); Akira Ijichi, Odawara (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 17/669,835

(22) Filed: Feb. 11, 2022

(65) Prior Publication Data

US 2022/0297545 A1 Sep. 22, 2022

(30) Foreign Application Priority Data

Mar. 22, 2021 (JP) ................................ 2021-047850

(51) Int. Cl.
*B60L 7/26* (2006.01)
*B60K 17/346* (2006.01)
(Continued)

(52) U.S. Cl.
CPC ............ *B60L 7/26* (2013.01); *B60K 17/3467* (2013.01); *B60K 23/0808* (2013.01);
(Continued)

(58) Field of Classification Search
CPC .............. F16H 3/66; F16H 2200/0043; F16H 2200/2007; F16H 2200/2041;
(Continued)

(56) References Cited

U.S. PATENT DOCUMENTS 7,798,938 B2 * 9/2010 Matsubara ............ B60W 10/06
477/3
7,976,428 B2 * 7/2011 Matsubara ............ B60W 20/10
477/6
(Continued)

FOREIGN PATENT DOCUMENTS

DE 20 2015 104 054 U1 11/2015
JP 2001-247025 A 9/2001
(Continued)

*Primary Examiner* — Phutthiwat Wongwian
*Assistant Examiner* — Susan E Scharpf
(74) *Attorney, Agent, or Firm* — Oliff PLC

(57) ABSTRACT

A vehicle drive device and a control method therefor are provided. The vehicle drive device includes: a power source including a first rotating electrical machine; a second rotating electrical machine; a differential unit including three rotating elements to which a first output shaft, a second output shaft, and the second rotating electrical machine are connected; and an electronic control device. The electronic control device regeneratively controls the first rotating electrical machine and the second rotating electrical machine in such a manner that negative torque is applied to the first output shaft and the second output shaft, when performing regenerative control by the second rotating electrical machine in a drive mode in which torque from the power source is distributed to the first output shaft and the second output shaft by controlling torque of the second rotating electrical machine during deceleration of a vehicle.

6 Claims, 14 Drawing Sheets

(51) Int. Cl.
*B60K 23/08* (2006.01)
*B60T 8/26* (2006.01)
*B60W 10/188* (2012.01)
*B60W 20/14* (2016.01)
*B60W 20/15* (2016.01)
*F16H 3/66* (2006.01)

(52) U.S. Cl.
CPC .......... *B60T 8/267* (2013.01); *B60W 10/188* (2013.01); *B60W 20/15* (2016.01); *B60K 2023/0825* (2013.01); *B60L 2240/423* (2013.01); *B60T 2270/606* (2013.01); *B60T 2270/608* (2013.01); *B60W 20/14* (2016.01); *B60W 2540/12* (2013.01); *B60W 2720/403* (2013.01); *B60Y 2200/92* (2013.01); *F16H 3/66* (2013.01); *F16H 2200/0043* (2013.01)

(58) Field of Classification Search
CPC ..... F16H 2200/2066; F16H 2200/2082; B60Y 2200/92; B60W 10/188; B60W 20/15; B60W 20/14; B60W 2540/12; B60W 2720/403; B60W 2510/244; B60W 2710/125; B60W 2720/106; B60W 10/08; B60W 10/14; B60W 30/18127; B60W 2710/083; B60W 10/184; B60W 20/00; B60T 8/267; B60T 2270/606; B60T 2270/608; B60L 7/26; B60L 2240/423; B60K 17/3467; B60K 23/0808; B60K 2023/0825; B60K 17/3462; B60K 23/08; B60K 2006/381; B60K 6/26; B60K 6/365; B60K 6/383; B60K 6/387; B60K 6/445; B60K 6/52; B60K 6/547; B60K 17/356
See application file for complete search history.

(56) References Cited

U.S. PATENT DOCUMENTS

| | | | | |
|---|---|---|---|---|
| 2003/0184152 | A1* | 10/2003 | Cikanek | B60W 30/18127 903/946 |
| 2006/0166784 | A1* | 7/2006 | Tabata | B60W 10/08 477/37 |
| 2008/0300100 | A1* | 12/2008 | Matsubara | B60L 7/14 477/5 |
| 2009/0093331 | A1* | 4/2009 | Iwanaka | B60K 6/365 903/910 |
| 2009/0227409 | A1* | 9/2009 | Ito | B60K 6/547 477/3 |
| 2010/0175944 | A1* | 7/2010 | Hayashi | B60K 6/445 180/242 |
| 2011/0245007 | A1* | 10/2011 | Yoshimura | B60K 6/52 903/910 |
| 2011/0276241 | A1* | 11/2011 | Nakao | B60W 10/06 477/3 |
| 2013/0166120 | A1* | 6/2013 | Choi | B60W 10/06 180/65.265 |
| 2013/0332015 | A1* | 12/2013 | Dextreit | B60W 10/06 180/65.23 |
| 2015/0021110 | A1* | 1/2015 | Ono | F16H 3/728 903/919 |
| 2015/0072819 | A1* | 3/2015 | Ono | B60W 10/115 475/5 |

FOREIGN PATENT DOCUMENTS

| | | |
|---|---|---|
| JP | 2005-029118 A | 2/2005 |
| JP | 2007-246056 A | 9/2007 |
| JP | 2010-149745 A | 7/2010 |
| JP | 2013-133101 A | 7/2013 |

* cited by examiner

|  | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |
| R | ○ |  |  | ○ |  |

FIG. 9

| DRIVE STATE | MODE | BF1 | CF1 | D1 | | D2 | |
|---|---|---|---|---|---|---|---|
| | | | | (1) | (2) | (1) | (2) |
| 1 | EV(FF)_ Hi | | ○ | △ | | | |
| 2 | EV(FF)_ Lo | ○ | | △ | | | |
| 3 | H4_TORQUE SPLIT | | | ○ | | ○ | |
| 4 | H4_ LSD | | ○ CONTROL | ○ | | ○ | |
| 5 | H4_ Lock | | | ○ | | | ○ |
| 6 | L4_ Lock | ○ | | | ○ | | ○ |

VEHICLE DRIVE DEVICE AND CONTROL METHOD FOR THE SAME

CROSS-REFERENCE TO RELATED APPLICATION

This application claims priority to Japanese Patent Application No. 2021-047850 filed on Mar. 22, 2021, incorporated herein by reference in its entirety.

BACKGROUND

1. Technical Field

The present disclosure relates to vehicle drive devices and control methods thereof.

2. Description of Related Art

Japanese Unexamined Patent Application Publication No. 2007-246056 (JP 2007-246056 A) discloses a vehicle drive device including a power source, a second rotating electrical machine, a first output shaft, a second output shaft, and a differential mechanism. The power source includes a first rotating electrical machine. The first output shaft is connected to the power source and outputs power to either front wheels or rear wheels. The second output shaft outputs power to the other of the front wheels and the rear wheels. The differential mechanism includes a first rotating element connected to the first output shaft, a second rotating element connected to the second output shaft, and a third rotating element connected to the second rotating electrical machine. The vehicle drive device distributes torque from the power source to the first output shaft and the second output shaft by controlling the torque from the rotating electrical machine.

SUMMARY

In the vehicle drive device disclosed in JP 2007-246056 A, when performing regenerative control of the second rotating electrical machine in a drive mode in which the torque from the power source is distributed to the first output shaft and the second output shaft by controlling the torque from the second rotating electrical machine during deceleration of the vehicle, positive torque is applied to the first rotating element by the regenerative control of the second rotating electrical machine, and positive torque is therefore applied to the first output shaft.

The present disclosure was made in view of the above problems, and provides a vehicle drive device and a control method for the vehicle drive device in which a first rotating electrical machine and a second rotating electrical machine can be regeneratively controlled so that negative torque is applied to a first output shaft and a second output shaft while performing regenerative control of the second rotating electrical machine during deceleration of a vehicle.

A first aspect of the present disclosure relates to a vehicle drive device including: a power source including a first rotating electrical machine; a second rotating electrical machine; a first output shaft; a second output shaft; a differential unit; and an electronic control device. The first output shaft is connected to the power source and is configured to output power to one of a front wheel and a rear wheel. The second output shaft is configured to output power to another of the front wheel and the rear wheel. The differential unit includes a first rotating element connected to the first output shaft, a second rotating element connected to the second output shaft, and a third rotating element connected to the second rotating electrical machine. The electronic control device is configured to perform regenerative control of the first rotating electrical machine and the second rotating electrical machine in such a manner that negative torque is applied to the first output shaft and the second output shaft, when performing regenerative control of the second rotating electrical machine in a drive mode in which torque from the power source is distributed to the first output shaft and the second output shaft by controlling torque of the second rotating electrical machine during deceleration of a vehicle equipped with the vehicle drive device.

According to the vehicle drive device of the first aspect, negative torque can be applied to the first output shaft and the second output shaft while performing the regenerative control of the second rotating electrical machine during deceleration of the vehicle.

In the vehicle drive device of the first aspect, the electronic control device may be configured to regeneratively control the first rotating electrical machine and the second rotating electrical machine in such a manner that a braking force distribution ratio between the front wheel and the rear wheel becomes a target braking force distribution ratio during deceleration of the vehicle.

According to the vehicle drive device having the above configuration, appropriate braking forces can be applied to the front wheel and the rear wheel.

In the vehicle drive device of the first aspect, the electronic control device may be configured to, when the braking force distribution ratio is not controllable to the target braking force distribution ratio by the regenerative control of the first rotating electrical machine and the second rotating electrical machine during deceleration of the vehicle, control the braking force distribution ratio to the target braking force distribution ratio by covering by a wheel brake a shortage of a braking force obtained by the regenerative control of the first rotating electrical machine and the second rotating electrical machine with respect to braking forces required for the front wheel and the rear wheel.

According to the vehicle drive device having the above configuration, appropriate braking forces can be applied to the front wheel and the rear wheel even when the braking force distribution ratio is not controllable to the target braking force distribution ratio by the regenerative control of the first rotating electrical machine and the second rotating electrical machine.

In the vehicle drive device having the above configuration, the electronic control device may be configured to set the target braking force distribution ratio according to target deceleration.

According to the vehicle drive device having the above configuration, the target braking force distribution ratio suitable for the target deceleration can be set.

In the vehicle drive device of the first aspect, the electronic control device may be configured to cover a shortage of deceleration by a wheel brake when target deceleration is not achievable by the regenerative control of the first rotating electrical machine and the second rotating electrical machine due to limitation on an amount of regeneration of the first rotating electrical machine.

According to the vehicle drive device having the above configuration, the target deceleration can be achieved even when the target deceleration is not achievable by the regenerative control of the first rotating electrical machine and the second rotating electrical machine due to the limitation on the amount of regeneration of the first rotating electrical machine.

A second aspect of the present disclosure relates to a control method for a vehicle drive device, the vehicle drive device including: a power source including a first rotating electrical machine; a second rotating electrical machine; a first output shaft; a second output shaft; and a differential unit. The first output shaft is connected to the power source and is configured to output power to one of a front wheel and a rear wheel.

The second output shaft is configured to output power to another of the front wheel and the rear wheel. The differential unit includes a first rotating element connected to the first output shaft, a second rotating element connected to the second output shaft, and a third rotating element connected to the second rotating electrical machine. In the control method, regenerative control of the first rotating electrical machine and the second rotating electrical machine is performed in such a manner that negative torque is applied to the first output shaft and the second output shaft, when performing regenerative control of the second rotating electrical machine in a drive mode in which torque from the power source is distributed to the first output shaft and the second output shaft by controlling torque of the second rotating electrical machine during deceleration of a vehicle equipped with the vehicle drive device.

According to the control method of the second aspect, negative torque can be applied to the first output shaft and the second output shaft while performing the regenerative control of the second rotating electrical machine during deceleration of the vehicle.

The vehicle drive device and the control method for the vehicle drive device according to the present disclosure have an advantageous effect, that is: negative torque can be applied to the first output shaft and the second output shaft while performing the regenerative control of the second rotating electrical machine during deceleration of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 shows the relationship between each drive state of the transfer and the operating state of each engagement device;

DETAILED DESCRIPTION OF EMBODIMENTS

An embodiment of a vehicle drive device according to the present disclosure will be described below. The present disclosure is not limited to the embodiment.

Figure 1:
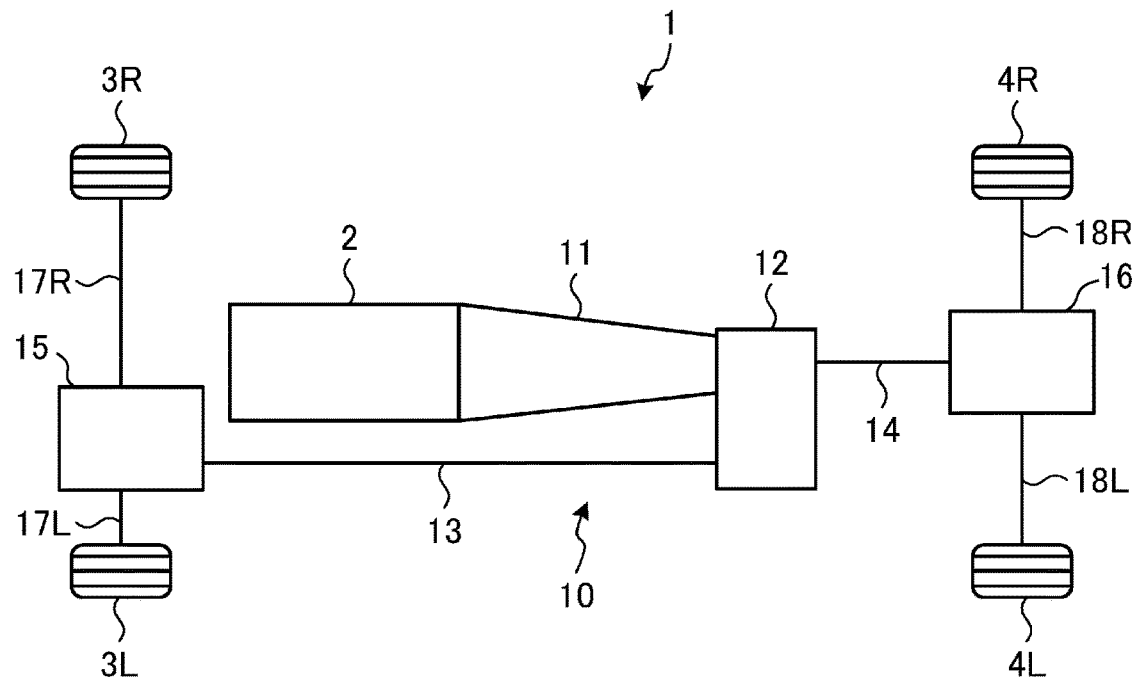
FIG. 1 shows a schematic configuration of a vehicle equipped with a vehicle drive device according to an embodiment.

FIG. 1 shows a schematic configuration of a vehicle 1 equipped with a drive device 10 according to the embodiment. The vehicle 1 includes right and left front wheels 3R, 3L, right and left rear wheels 4R, 4L, and the drive device 10. The drive device 10 is a device that transfers the power (torque) from an engine 2 that is a first power source to the right and left front wheels 3R, 3L and the right and left rear wheels 4R, 4L. This vehicle 1 is a four-wheel drive vehicle based on front-engine, rear-wheel drive layout.

The drive device 10 includes a compound transmission 11, a transfer 12, a front propeller shaft 13, a rear propeller shaft 14, a front wheel differential gear mechanism 15, a rear wheel differential gear mechanism 16, right and left front wheel axles 17R, 17L, and right and left rear wheel axles 18R, 18L. The compound transmission 11 is connected to the engine 2. The transfer 12 is a front and rear wheel power distribution device connected to the compound transmission 11. The front propeller shaft 13 and the rear propeller shaft 14 are connected to the transfer 12. The front wheel differential gear mechanism 15 is connected to the front propeller shaft 13. The rear wheel differential gear mechanism 16 is connected to the rear propeller shaft 14. The right and left front wheel axles 17R, 17L are connected to the front wheel differential gear mechanism 15. The right and left rear wheel axles 18R, 18L are connected to the rear wheel differential gear mechanism 16. The right and left front wheels 3R, 3L, the right and left rear wheels 4R, 4L, the right and left front wheel axles 17R, 17L, and the right and left rear wheel axles 18R, 18L are simply referred to as the front wheels 3, the rear wheels 4, the front wheel axles 17, and the rear wheel axles 18 with the letters R, L omitted when right and left are not particularly differentiated from each other.

The engine 2 is a known internal combustion engine such as gasoline engine or diesel engine. In the engine 2, engine torque that is the output torque of the engine 2 is controlled by controlling an engine control device 101 such as throttle actuators, fuel injection devices, and ignition devices provided in the engine 2 by an electronic control device 100 that will be described later.

The power output from the engine 2 is transferred to the transfer 12 via the compound transmission 11. The power transferred to the transfer 12 is then transferred from the transfer 12 to the rear wheels 4 sequentially via the rear propeller shaft 14, the rear wheel differential gear mechanism 16, and the rear wheel axles 18, namely via a power transfer path on the rear wheel side. A part of the power transferred to the transfer 12 is distributed to the front wheels 3 by the transfer 12. The part of the power transferred to the transfer 12 is transferred from the transfer 12 to the front wheels 3 sequentially via the front propeller shaft 13, the front wheel differential gear mechanism 15, and the front wheel axles 17, namely via a power transfer path on the front wheel side. The power has the same meaning as torque and force unless otherwise specified.

Figure 2:
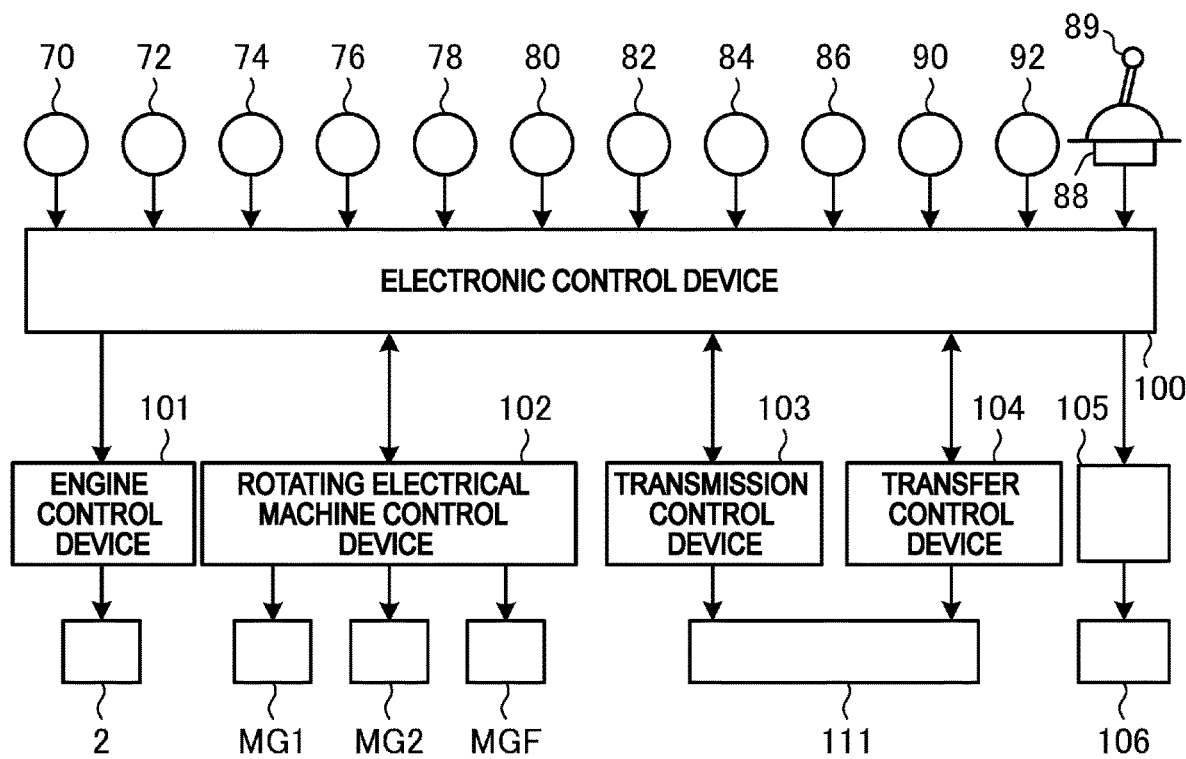
FIG. 2 illustrates a main part of a control system for various controls in the vehicle drive device according to the embodiment.

As shown in FIG. 2, the drive device 10 includes the electronic control device 100. The electronic control device 100 includes, for example, a so-called microcomputer including a central processing unit (CPU), a random-access memory (RAM), a read-only memory (ROM), an input and output interface, etc. The CPU performs various controls by performing signal processing according to a program stored in advance in the ROM while using the temporary storage function of the RAM.

Output signals etc. from various sensors, switches, etc. provided in the vehicle 1 (e.g., an engine speed sensor 70, an output rotational speed sensor 72, an MG1 rotational speed sensor 74, an MG2 rotational speed sensor 76, an accelerator operation amount sensor 78, a throttle valve opening degree sensor 80, a battery sensor 82, an oil temperature sensor 84, a four-wheel drive (4WD) selection switch 86, a shift position sensor 88 of a shift lever 89, a Low selection switch 90, and a Lock selection switch 92) are input to the electronic control device 100. The electronic control device 100 calculates a state-of-charge value SOC (%) based on, for example, the charge and discharge current and battery voltage of a battery that is an energy storage device. The state-of-charge value SOC is a value indicating the amount of charge left in the battery.

In the vehicle 1, wheel brakes 106 are provided near the front wheels 3 and the rear wheels 4. The wheel brakes 106 are braking mechanisms for slowing down or stopping the rotation of the front wheels 3 and the rear wheels 4. The wheel brakes 106 receive an operating force from a brake actuator 105. The operating force of the wheel brakes 106 is controlled by the electronic control device 100 via the brake actuator 105 based on the operation amount (depressing force) of a brake pedal operated by a driver.

The electronic control device 100 outputs various command signals to devices provided in the drive device 10 (e.g., an engine control device 101, a rotating electrical machine control device 102, a transmission control device 103, and a transfer control device 104). The various command signals are, for example, an engine control command signal, rotating electrical machine control command signals, and hydraulic control command signals. The engine control command signal is a signal for controlling the engine 2. The rotating electrical machine control command signals are signals for controlling a first rotating electrical machine MG1, a second rotating electrical machine MG2, and a third rotating electrical machine MGF. The hydraulic control command signals are signals for controlling the oil pressures of a hydraulic control circuit 111 that controls the operating state of engagement devices of the compound transmission 11, engagement devices of the transfer 12, etc.

Figures 3, 4:
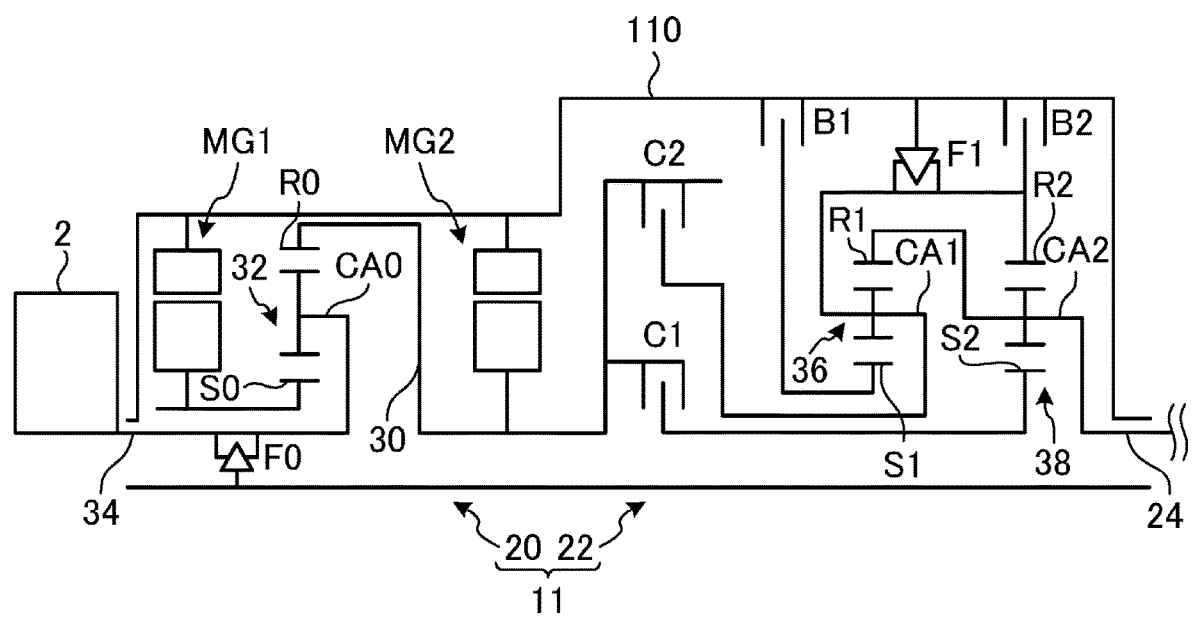
FIG. 3 illustrates a schematic configuration of a composite transmission mounted on the vehicle equipped with the vehicle drive device according to the embodiment.
FIG. 4 illustrates the relationship between the shift stage of a stepped transmission unit included in the composite transmission and the combination of operations of engagement devices.

FIG. 3 illustrates a schematic configuration of the compound transmission 11 according to the embodiment. The first rotating electrical machine MG1 and the second rotating electrical machine MG2 are rotating electrical machines functioning as both a motor and a generator, and are so-called motor generators. The first rotating electrical machine MG1 and the second rotating electrical machine MG2 function as a traction power source capable of generating driving torque, namely as a first driving source. The second rotating electrical machine MG2 is an example of a first rotating electrical machine of the first power source in the present disclosure. Each of the first rotating electrical machine MG1 and the second rotating electrical machine MG2 is connected to the battery (not shown) via an inverter (not shown) provided in the vehicle 1. The battery is an energy storage device provided in the vehicle 1. For the first rotating electrical machine MG1 and the second rotating electrical machine MG2, the inverters are controlled by the rotating electrical machine control device 102 to control MG1 torque and MG2 torque. The MG1 torque is the output torque from the first rotating electrical machine MG1, and the MG2 torque is the output torque from the second rotating electrical machine MG2. The output torque of the rotating electrical machine is power running torque when it is positive torque, namely when it is accelerating torque. The output torque of the rotating electrical machine is regenerative torque when it is negative torque, namely when it is decelerating torque. The battery is an energy storage device that supplies and receives electric power to and from each of the first rotating electrical machine MG1 and the second rotating electrical machine MG2. The vehicle 1 is therefore a hybrid vehicle.

The compound transmission 11 includes a continuously variable transmission unit 20 that is an electric differential unit and a stepped transmission unit 22 that is a mechanical transmission unit. The continuously variable transmission unit 20 and the stepped transmission unit 22 are arranged in series on a common axis in a transmission case 110. The transmission case 110 is a non-rotating member attached to a vehicle body. The continuously variable transmission unit 20 is directly connected to the engine 2 or is indirectly connected to the engine 2 via a damper, not shown, etc. The stepped transmission unit 22 is connected to the output side of the continuously variable transmission unit 20. An output shaft 24 is connected to the transfer 12. The output shaft 24 is an output rotating member of the stepped transmission unit 22. In the drive device 10, the power output from the engine 2 and the second rotating electrical machine MG2 is transferred to the stepped transmission unit 22, and is then transferred from the stepped transmission unit 22 to the drive wheels via the transfer 12 etc. Each of the continuously variable transmission unit 20, the stepped transmission unit 22, etc. is configured substantially symmetrically with respect to the common axis. The lower halves of the continuously variable transmission unit 20, the stepped transmission unit 22, etc. that are located below the axis are not shown in FIG. 3. The common axis is the axis of a crankshaft of the engine 2, a connecting shaft 34, etc.

The continuously variable transmission unit 20 includes the first rotating electrical machine MG1 and a differential unit 32 that is a differential mechanism. The differential unit 32 is a power split mechanism that mechanically splits the power from the engine 2 between the first rotating electrical machine MG1 and an intermediate transfer member 30. The intermediate transfer member 30 is an output rotating member of the continuously variable transmission unit 20. The second rotating electrical machine MG2 is connected to the intermediate transfer member 30 such that power can be transferred therebetween. The continuously variable transmission unit 20 is an electric differential unit in which the differential state of the differential unit 32 is controlled by controlling the operating state of the first rotating electrical machine MG1. The continuously variable transmission unit 20 is operated as an electric continuously variable transmission in which a gear ratio that is a value of the ratio between the engine speed and an MG2 rotational speed is changed. The engine speed has the same value as the rotational speed of the connecting shaft 34 serving as an input rotating member. The MG2 rotational speed is a rotational speed of the intermediate transfer member 30 serving as an output rotating member.

The differential unit 32 that is a differential mechanism is a single-pinion planetary gear unit, and includes a sun gear S0, a carrier CA0, and a ring gear R0. The engine 2 is connected to the carrier CA0 via the connecting shaft 34 such that power can be transferred therebetween. The first rotating electrical machine MG1 is connected to the sun gear S0 such that power can be transferred therebetween. The second rotating electrical machine MG2 is connected to the ring gear R0 such that power can be transferred therebetween. In the differential unit 32, the carrier CA0 functions as an input element, the sun gear S0 functions as a reaction force element, and the ring gear R0 functions as an output element.

The stepped transmission unit 22 is a mechanical transmission unit that serves as a stepped transmission forming a part of a power transfer path between the intermediate transfer member 30 and the transfer 12. That is, the stepped transmission unit 22 is a mechanical transmission unit forming a part of a power transfer path between the continuously variable transmission unit 20 and the transfer 12. The intermediate transfer member 30 also functions as an input rotating member of the stepped transmission unit 22. The stepped transmission unit 22 is a known planetary gear automatic transmission that includes a plurality of sets of planetary gear units and a plurality of engagement devices. For example, the sets of planetary gear units are a first planetary gear unit 36 and a second planetary gear unit 38, and the engagement devices are a clutch C1, a clutch C2, a brake B1, and a brake B2. The engagement devices also include a one-way clutch F1. Hereinafter, the clutch C1, the clutch C2, the brake B1, and the brake B2 are simply referred to as the engagement devices CB unless specifically distinguished.

The engagement devices CB are hydraulic friction engagement devices that are multi-plate or single-plate clutches and brakes that are pressed by a hydraulic actuator, a band brake that is tightened by the hydraulic actuator, etc. The engagement devices CB are switched between operating states such as engaged state and disengaged state by hydraulic pressures that are regulated predetermined hydraulic pressures output from the hydraulic control circuit 111 provided in the vehicle 1.

In the stepped transmission unit 22, a part of rotating elements of the first planetary gear unit 36 and a part of rotating elements of the second planetary gear unit 38 are connected to each other either directly or indirectly via the engagement device CB or the one-way clutch F1, or the rotating elements of the first planetary gear unit 36 and the rotating elements of the second planetary gear unit 38 are connected to the intermediate transfer member 30, the transmission case 110, or the output shaft 24 either directly or indirectly via the engagement device CB or the one-way clutch F1. The rotating elements of the first planetary gear unit 36 are a sun gear S1, a carrier CA1, and a ring gear R1, and the rotating elements of the second planetary gear unit 38 are a sun gear S2, a carrier CA2, and a ring gear R2.

The stepped transmission unit 22 is a stepped transmission that forms any one of a plurality of shift stages (also referred to as gear stages) having different gear ratios (=automatic transmission (AT) input rotational speed/output rotational speed) by engaging, for example, a predetermined engagement device CB, namely one of the engagement devices CB. That is, the stepped transmission unit 22 switches the gear stage, namely perform shifting, by selectively engaging the engagement devices CB. The stepped transmission unit 22 is a stepped automatic transmission that forms each of the gear stages. In the embodiment, the gear stage that is formed by the stepped transmission unit 22 is referred to as the AT gear stage. The AT input rotational speed is the input rotational speed of the stepped transmission unit 22 that is the rotational speed of the input rotating member of the stepped transmission unit 22. The AT input rotational speed has the same value as the rotational speed of the intermediate transfer member 30 and also has the same value as the MG2 rotational speed that is the rotational speed of the second rotating electrical machine MG2. The AT input rotational speed can be expressed by the MG2 rotational speed. The output rotational speed is the rotational speed of the output shaft 24 that is the output rotational speed of the stepped transmission unit 22. The output rotational speed is also the output rotational speed of the compound transmission 11 that is the entire combined transmission of the continuously variable transmission unit 20 and the stepped transmission unit 22. The compound transmission 11 is a transmission constituting a part of the power transfer path between the engine 2 and the transfer 12.

FIG. 4 illustrates the relationship between the AT gear stage of the stepped transmission unit 22 and the combination of operations of the engagement devices CB. In FIG. 4, "O" indicates engaged and "Δ" indicates engaged as needed, and blank indicates disengaged. The stepped transmission unit 22 has a plurality of the AT gear stages. For example, as shown in FIG. 4, the stepped transmission unit 22 has four forward AT gear stages from an AT first gear stage ("1st" in FIG. 4) to an AT fourth gear stage ("4th" in FIG. 4) and a reverse AT gear stage ("R" in FIG. 4). The gear ratio of the AT first gear stage is the highest. The higher the AT gear stage, the lower the gear ratio.

The stepped transmission unit 22 switches the AT gear stage that is formed according to an accelerator operation by the driver, vehicle speed, etc. by the electronic control device 100. That is, the stepped transmission unit 22 selectively forms the AT gear stages by the electronic control device 100. For example, in shift control of the stepped transmission unit 22, so-called clutch-to-clutch shifting is performed. In the clutch-to-clutch shifting, shifting is performed by switching the operating state of any of the engagement devices CB, that is, by switching between engagement and disengagement of the engagement devices CB. In the embodiment, for example, a downshift from the AT second gear stage to the AT first gear stage is represented as a 2→1 downshift. The same applies to other upshifts and downshifts.

Referring back to FIG. 3, the compound transmission 11 further includes a one-way clutch F0. The one-way clutch F0 is a lock mechanism capable of holding the carrier CA0 stationary. That is, the one-way clutch F0 is a lock mechanism capable of holding the connecting shaft 34 that is connected to the crankshaft of the engine 2 and that rotates together with the carrier CA0 stationary with respect to the transmission case 110. One of two members of the one-way clutch F0 that are rotatable relative to each other is integrally connected to the connecting shaft 34, and the other member is integrally connected to the transmission case 110. The one-way clutch F0 idles in the positive rotational direction that is the rotational direction during running of the engine 2, and is automatically engaged in the rotational direction opposite to that during running of the engine 2. Therefore, when the one-way clutch F0 idles, the engine 2 can rotate relative to the transmission case 110. On the other hand, when the one-way clutch F0 is engaged, the engine 2 cannot rotate relative to the transmission case 110. That is, the engine 2 is held stationary with respect to the transmission case 110 as the one-way clutch F0 is engaged. As described above, the one-way clutch F0 allows the carrier CA0 to rotate in the positive rotational direction that is the rotation direction during running of the engine 2, and does not allow the carrier CA0 to rotate in the negative rotational direction. That is, the one-way clutch F0 is a lock mechanism capable of allowing the engine 2 to rotate in the positive rotational direction and not allowing the engine 2 to rotate in the negative rotational direction.

In the compound transmission 11, a continuously variable transmission in which the continuously variable transmission unit 20 and the stepped transmission unit 22 are arranged in series can be configured by the stepped transmission unit 22 having the AT gear stages and the continuously variable transmission unit 20 that is operated as a continuously variable transmission. Alternatively, the continuously variable transmission unit 20 can be caused to perform shifting like a stepped transmission does. Therefore, the compound transmission 11 as a whole can be caused to perform shifting like a stepped transmission does. That is, in the compound transmission 11, the stepped transmission unit 22 and the continuously variable transmission unit 20 can be controlled so as to selectively establish the gear stages having different gear ratios. Each gear ratio represents the value of the ratio of the engine speed to the output rotational speed.

Figure 5:
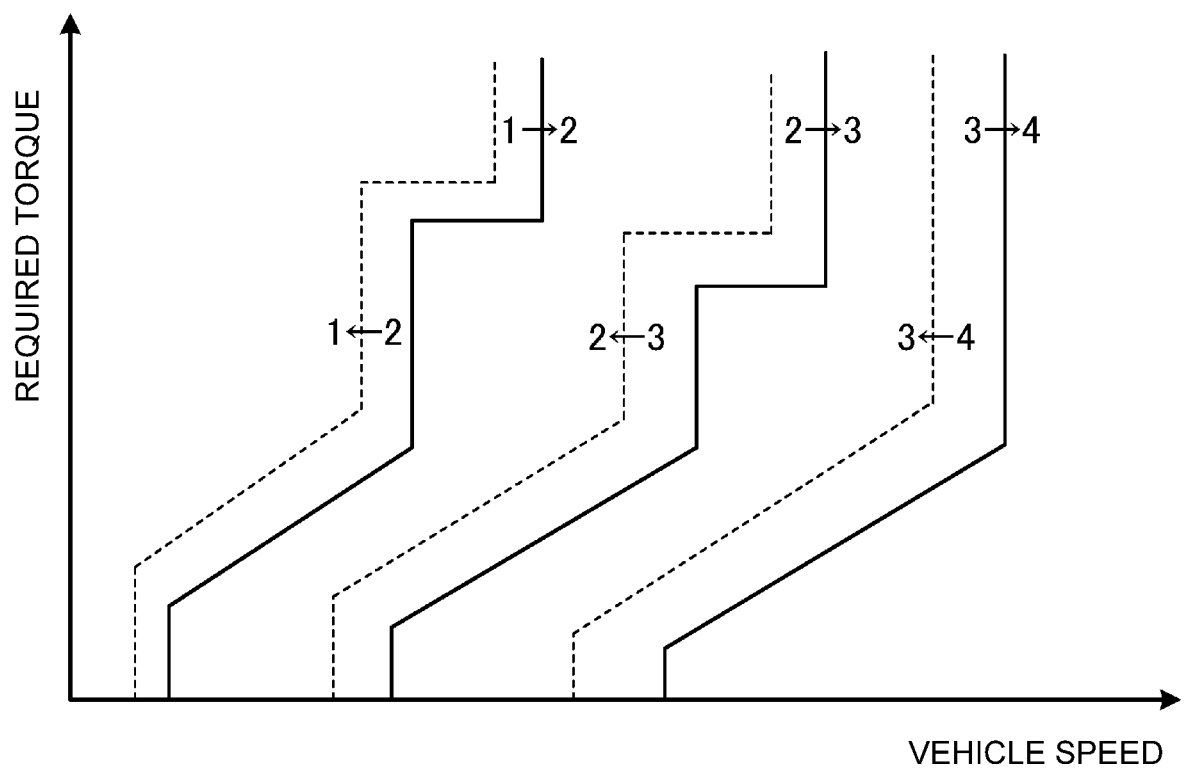
FIG. 5 shows an example of a shift map that is used for shift control of the stepped transmission unit.

The electronic control device 100 makes shift determination of the stepped transmission unit 22 using, for example, an AT gear stage shift map as shown in FIG. 5, and performs the shift control of the stepped transmission unit 22 via the transmission control device 103 as needed. The AT gear stage shift map represents a predetermined relationship. In the shift control of the stepped transmission unit 22, the transmission control device 103 outputs a hydraulic control command signal to the hydraulic control circuit 111 so as to automatically switch the AT gear stage of the stepped transmission unit 22. The hydraulic control command signal is a signal for switching the engagement device CB between the engaged state and the disengaged state by a corresponding solenoid valve.

The AT gear stage shift map shown in FIG. 5 represents a predetermined relationship having a shift line for determining gear shifting of the stepped transmission unit 22 on two-dimensional coordinates using, for example, the vehicle speed and the required driving torque that is calculated based on the accelerator operation amount as variables. In the AT gear stage shift map, the output rotational speed etc. may be used instead of the vehicle speed, and the required driving force, accelerator operation amount, throttle valve opening degree, etc. may be used instead of the required driving torque. In the AT gear stage shift map shown in FIG. 5, the shift lines shown by continuous lines are upshift lines for determining an upshift, and the shift lines shown by dashed lines are downshift lines for determining a downshift.

Figure 6:
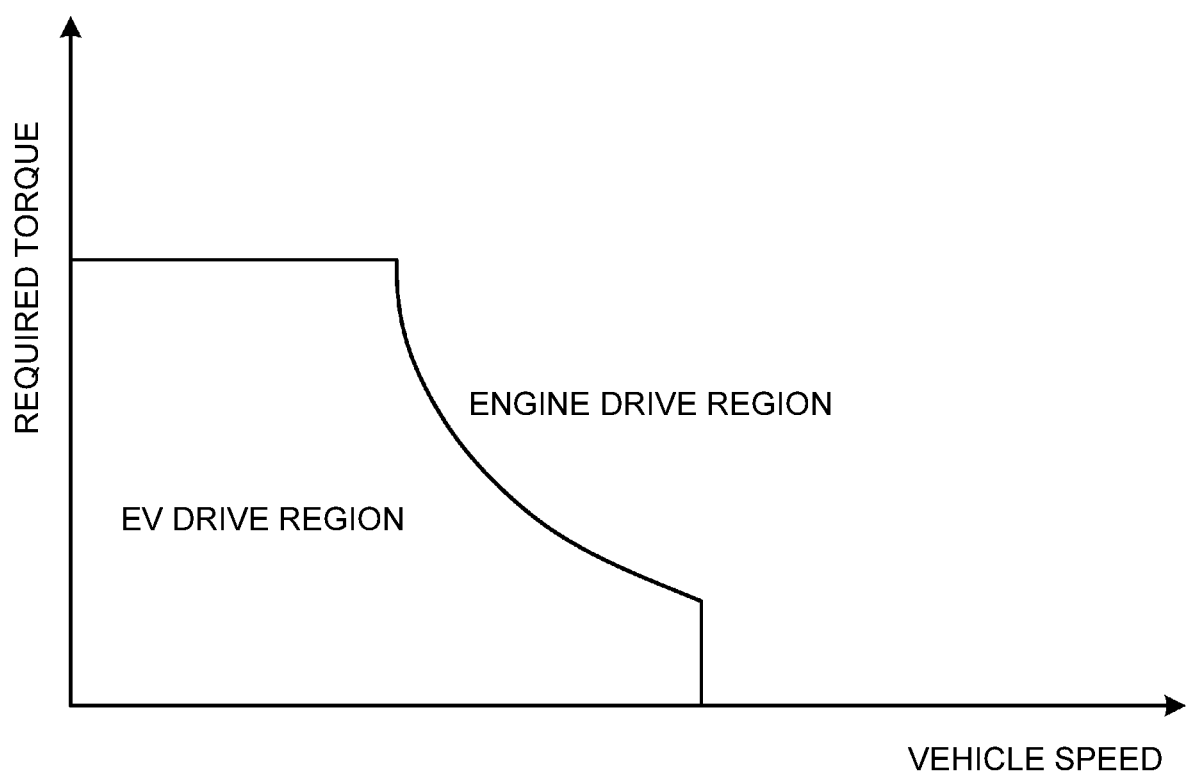
FIG. 6 shows an example of a power source switching map that is used to control switching between an electric vehicle (EV) drive mode and an engine drive mode.

FIG. 6 shows an example of a power source switching map that is used to control switching between an electric vehicle (EV) drive mode and an engine drive mode; In the drive device 10 according to the embodiment, the drive mode is switched between the EV drive mode and the engine drive mode based on such a power source switching map as shown in FIG. 6 that is used to control switching between the EV drive mode and the engine drive mode. The map shown in FIG. 6 represents a predetermined relationship having a boundary between an engine drive region and an EV drive region on two-dimensional coordinates using the vehicle speed and the required driving torque as variables. The engine drive region is a region where the vehicle travels in the engine drive mode, and the EV drive region is a region where the vehicle travels in the EV drive mode. The boundary between the EV drive region and the engine drive region in FIG. 6 is, in other words, a switching line for switching the drive mode between the EV drive mode and the engine drive mode.

Figure 7:
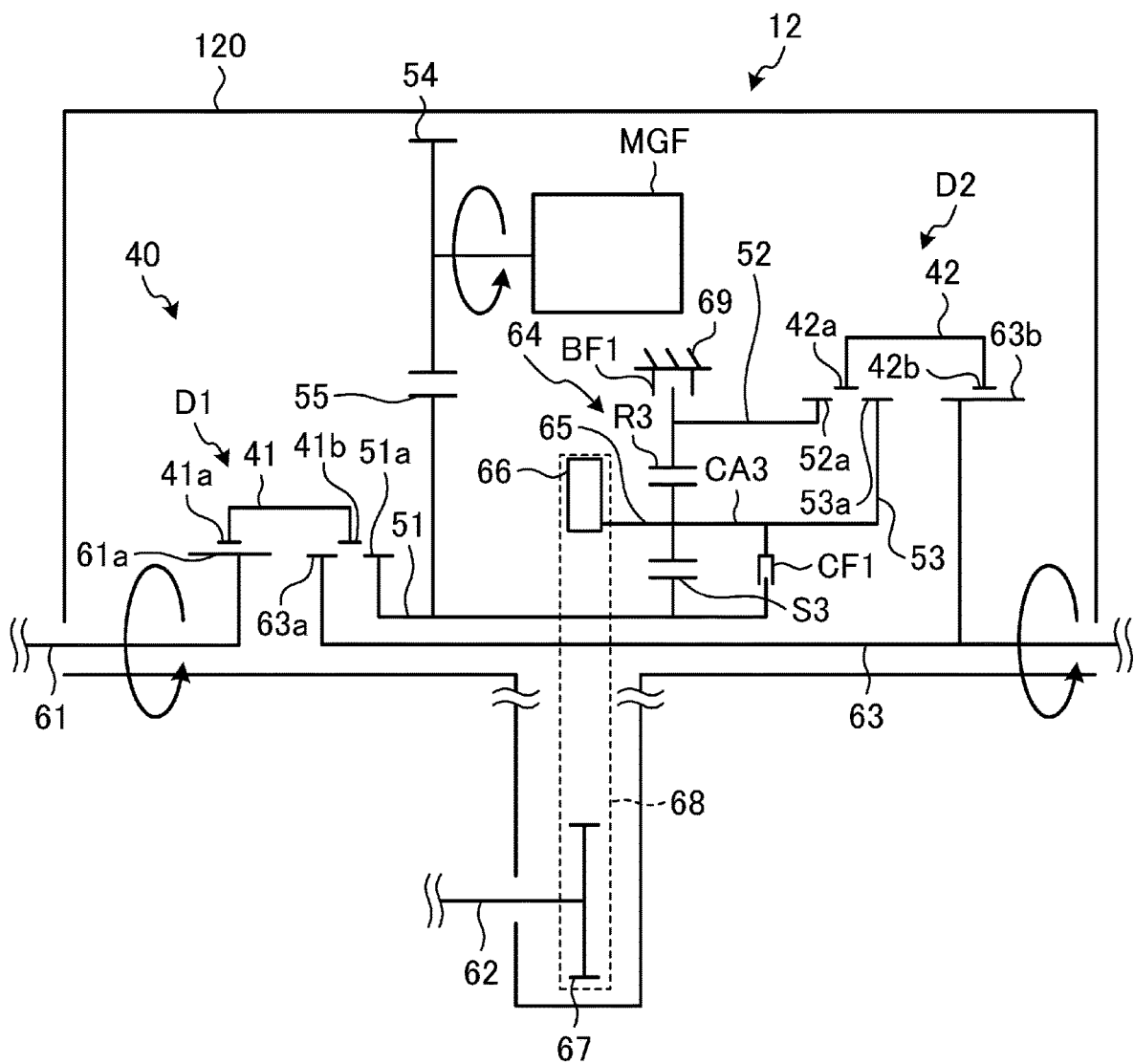
FIG. 7 is a skeleton diagram schematically showing a transfer mounted on the vehicle equipped with the vehicle drive device according to the embodiment, and showing the case where the transfer is in a first drive state.

FIG. 7 is a skeleton diagram schematically showing the transfer 12 of the embodiment, and showing the case where the transfer 12 is in a first drive state.

The transfer 12 of the embodiment includes a transfer case 120 that is a non-rotating member. The transfer 12 includes an input shaft 61, a rear wheel-side output shaft 63, and a front wheel-side output shaft 62 in the transfer case 120. The rear wheel-side output shaft 63 is a first output shaft that outputs power to the rear wheels 4. The front wheel-side output shaft 62 is a second output shaft that outputs power to the front wheels 3. A third planetary gear unit 64 is a unit serving as a differential mechanism. The transfer 12 further includes a transfer member 65, a drive gear 66, a driven gear 67, and a front wheel drive chain 68 in the transfer case 120. The transfer member 65, the drive gear 66, the driven gear 67, and the front wheel drive chain 68 are rotating members that form a power transfer path for the front wheels 3. The transfer member 65 is a member that functions as an input rotating member for the front wheels 3. The drive gear 66 is a gear that outputs power to the front wheel-side output shaft 62. The driven gear 67 is a gear integral with the front wheel-side output shaft 62. The front wheel drive chain 68 is a chain that connects the drive gear 66 and the driven gear 67. The transfer 12 further includes the third rotating electrical machine MGF, a connection switching device 40, a clutch CF1, and a brake BF1 in the transfer case 120. The third rotating electrical machine MGF functions as a second power source. The connection switching device 40 switches the connection state of the rotating members. The third rotating electrical machine MGF is an example of a second rotating electrical machine in the present disclosure.

The input shaft 61 is an input rotating member that applies power from the first power source such as the engine 2 to the transfer 12. Power from the compound transmission 11 is applied to the input shaft 61. For example, the input shaft 61 is spline-fitted to the output shaft 24 that is an output rotating member of the compound transmission 11.

The rear wheel-side output shaft 63 is an output rotating member that outputs power from the transfer 12 to the rear wheels 4. The rear wheel-side output shaft 63 is a drive shaft disposed coaxially with the input shaft 61 and connected to the rear propeller shaft 14 (see FIG. 1).

The front wheel-side output shaft 62 is an output rotating member that outputs power from the transfer 12 to the front wheels 3. The front wheel-side output shaft 62 is a drive shaft disposed on a different axis from the input shaft 61 and the rear wheel-side output shaft 63 and connected to the front propeller shaft 13 (see FIG. 1). The front wheel-side output shaft 62 rotates via the front wheel drive chain 68 and the driven gear 67 as the drive gear 66 rotates.

The drive gear 66 is connected to the transfer member 65 so as to rotate with the transfer member 65. The transfer member 65 is a rotating member that transfers power to the front wheel-side output shaft 62. The transfer member 65 and the drive gear 66 are disposed so as to be rotatable relative to the rear wheel-side output shaft 63. In the transfer 12, the transfer member 65, the drive gear 66, and the third planetary gear unit 64 are disposed on the same center of rotation as the rear wheel-side output shaft 63.

The third planetary gear unit 64 is a single-pinion planetary gear unit including three rotating elements. As shown in FIG. 7, the third planetary gear unit 64 includes a sun gear S3, a carrier CA3, and a ring gear R3 as the three rotating elements. The carrier CA3 supports a plurality of pairs of pinion gears meshing with each other so that they can rotate and revolve. The ring gear R3 meshes with the sun gear S3 via the pinion gears. The third rotating electrical machine MGF is constantly connected to the sun gear S3.

A first rotating member 51 that can be connected to the input shaft 61 is connected to the sun gear S3. The first rotating member 51 is a member that rotates with the sun gear S3 and has gear teeth 51a. An input gear 55 to which power from the third rotating electrical machine MGF is applied is attached to the first rotating member 51. The input gear 55 and the first rotating member 51 rotate together.

A third rotating member 53 that can be connected to the rear wheel-side output shaft 63 is connected to the carrier CA3. The third rotating member 53 is a member that rotates with the carrier CA3 and has gear teeth 53a. The transfer member 65 is connected to the carrier CA3. The transfer member 65 is a member that rotates with the carrier CA3.

A second rotating member 52 that can be connected to the rear wheel-side output shaft 63 is connected to the ring gear R3. The second rotating member 52 is a member that rotates with the ring gear R3 and includes gear teeth 52a.

The third rotating electrical machine MGF is a motor generator (MG) capable of functioning as a motor and a generator. The third rotating electrical machine MGF includes a rotor, a stator, and an output shaft that rotates with the rotor, and is electrically connected to the battery via an inverter. As shown in FIG. 7, an output gear 54 is provided on the output shaft of the third rotating electrical machine MGF. The output gear 54 meshes with the input gear 55, and the output gear 54 and the input gear 55 form a reduction gear train. Therefore, when MGF torque that is the output torque from the third rotating electrical machine MGF is transferred to the input gear 55, rotation of the third rotating electrical machine MGF is changed in speed (reduced in speed) and transferred to the sun gear S3.

The connection switching device 40 is a device that selectively switches members to which the input shaft 61 and the rear wheel-side output shaft 63 are connected. In other words, the connection switching device 40 is a device that switches the connection state of the rotating members of the transfer 12. Specifically, the connection switching device 40 selectively switches the members to which the first rotating member 51, the second rotating member 52, and the third rotating member 53 each of which rotates with a corresponding one of the rotating elements of the third planetary gear unit 64 are connected. As shown in FIG. 7, the connection switching device 40 includes a first dog clutch D1 and a second dog clutch D2.

The first dog clutch D1 is a first disconnection-connection mechanism that switches the member to which the input shaft 61 is connected. As shown in FIG. 7, the first dog clutch D1 selectively connects the input shaft 61 to the first rotating member 51 (sun gear S3) or the rear wheel-side output shaft 63. That is, the first dog clutch D1 switches between a first input state and a second input state. In the first input state, the power from the input shaft 61 is transferred to the rear wheel-side output shaft 63 not via the third planetary gear unit 64. In the second input state, the power from the input shaft 61 is transferred to the rear wheel-side output shaft 63 via the third planetary gear unit 64.

The first dog clutch D1 includes a first switching sleeve 41 that is a switching member. The first switching sleeve 41 has first gear teeth 41a and second gear teeth 41b. The first gear teeth 41a mesh with gear teeth 61a of the input shaft 61. The second gear teeth 41b mesh with first gear teeth 63a of the rear wheel-side output shaft 63 or the gear teeth 51a of the first rotating member 51. The first switching sleeve 41 is moved in the axial direction by an actuator for the first dog clutch D1. The first switching sleeve 41 is switched to any of the first input state, a disengaged state, and the second input state with the first gear teeth 41a constantly meshing with the gear teeth 61a of the input shaft 61. In the first input state, the second gear teeth 41b mesh with the first gear teeth 63a of the rear wheel-side output shaft 63. In the disengaged state, the second gear teeth 41b mesh with neither the first gear teeth 63a of the rear wheel-side output shaft 63 nor the gear teeth 51a of the first rotating member 51. In the second input state, the second gear teeth 41b mesh with the gear teeth 51a of the first rotating member 51.

The second dog clutch D2 is a second disconnection-connection mechanism that switches the member to which the rear wheel side-output shaft 63 is connected. The second dog clutch D2 selectively connects the rear wheel-side output shaft 63 to the second rotating member 52 (ring gear R3) or the third rotating member 53 (carrier CA3). That is, the second dog clutch D2 switches between a first transfer state and a second transfer state. In the first transfer state, power is transferred between the rear wheel-side output shaft 63 and the second rotating member 52 (ring gear R3). In the second transfer state, power is transferred between the rear wheel-side output shaft 63 and the third rotating member 53 (carrier CA3).

The second dog clutch D2 includes a second switching sleeve 42 that is a switching member. The second switching sleeve 42 has first gear teeth 42a and second gear teeth 42b. The first gear teeth 42a of the second switching sleeve 42 can selectively mesh with the gear teeth 52a of the second rotating member 52 that rotates with the ring gear R3 and the gear teeth 53a of the third rotating member 53 that rotates with the carrier CA3. The second switching sleeve 42 is moved in the axial direction by an actuator of the second dog clutch D2. The second switching sleeve 42 is switched to any of the first transfer state, a disengaged state, and the second transfer state with the second gear teeth 42b constantly meshing with the second gear teeth 63b of the rear wheel-side output shaft 63. In the first transfer state, the first gear teeth 42a mesh with the gear teeth 52a of the second rotating member 52. In the disengaged state, the first gear teeth 42a mesh with neither the gear teeth 52a of the second rotating member 52 nor the gear teeth 53a of the third rotating member 53. In the second transfer state, the first gear teeth 42a mesh with the gear teeth 53a of the third rotating member 53.

The clutch CF1 is a first engagement element of a differential mechanism that selectively engages the sun gear S3 and the carrier CA3 of the third planetary gear unit 64 to rotate the sun gear S3, the carrier CA3, and the ring gear R3 together.

The brake BF1 is a second engagement element of the differential mechanism that selectively holds the ring gear R3 of the third planetary gear unit 64 stationary with respect to a fixing member 69. The fixing member 69 is the transfer case 120 itself or a non-rotating member integral with the transfer case 120. The transfer 12 is set to a high speed-side shift stage Hi when the brake BF1 is disengaged, and is set to a low speed-side shift stage Lo when the brake BF1 is engaged.

Figure 8:
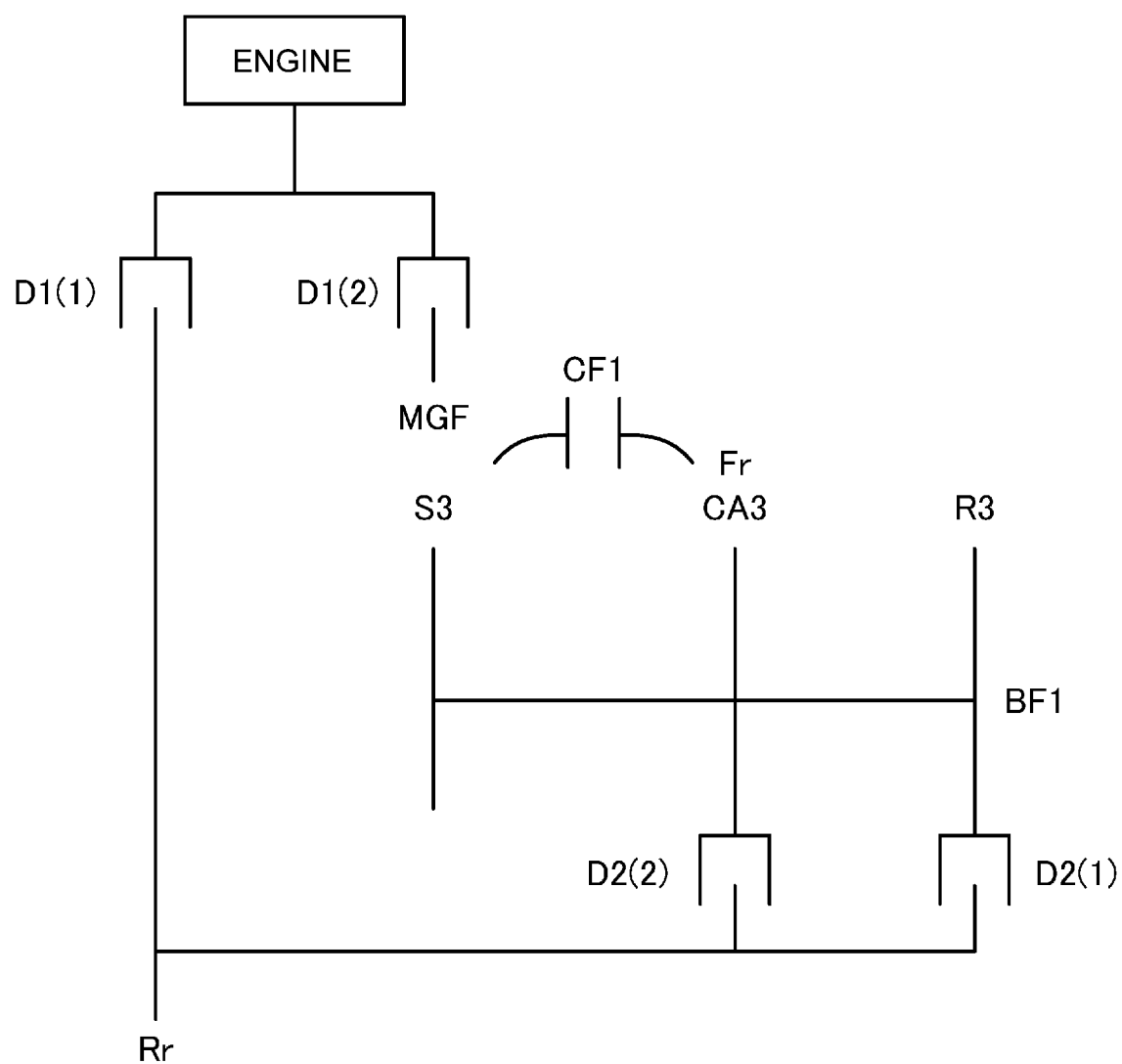
FIG. 8 shows the engagement relationship of each rotating member in the transfer.

FIG. 8 shows the engagement relationship of each rotating member in the transfer 12 of the embodiment. In FIG. 8, "MGF" represents the third rotating electrical machine MGF, "S3" represents the sun gear S3, "CA3" represents the carrier CA3, "R3" represents the ring gear R3, "BF1" represents the brake BF1, "CF1" represents the clutch CF1, "Fr" represents the front wheel-side output shaft 62, and "Rr" represents the rear wheel-side output shaft 63. In FIG. 8, D1(1) indicates the connection point of the first dog clutch D1 in the first input state, and D1(2) indicates the connection point of the first dog clutch D1 in the second input state. In FIG. 8, D2(1) indicates the connection point of the second dog clutch D2 in the first transfer state, and D2(2) indicates the connection point of the second dog clutch D2 in the second transfer state.

The transfer 12 of the embodiment is connected to an engine 2 etc. that is the first power source, and includes the rear wheel-side output shaft 63, the front wheel-side output shaft 62, the ring gear R3, the carrier CA3, and the third planetary gear unit 64. The rear wheel-side output shaft 63 is the first output shaft that outputs power to the rear wheels 4 that are either the front wheels 3 or the rear wheels 4. The front wheel-side output shaft 62 is the second output shaft that outputs power to the front wheels 3 that are the other of the front wheels 3 and the rear wheels 4. The ring gear R3 is a first rotating element that is connected to the rear wheel-side output shaft 63. The carrier CA3 is a second rotating element that is connected to the front wheel-side output shaft 62. The third planetary gear unit 64 is a unit serving as a differential mechanism having the sun gear S3 as a third rotating element that is connected to the third rotating electrical machine MGF.

The drive state of the transfer 12 of the embodiment is switched by the electronic control device 100. The drive state of the transfer 12 can be set to the first drive state, a second drive state, a third drive state, a fourth drive state, a fifth drive state, and a sixth drive state.

The first drive state to the sixth drive state will be described. FIG. 9 shows the relationship between each drive state of the transfer 12 and the operating state of each engagement device. In FIG. 9, "O" indicates engaged, "Δ" indicates engaged as needed, and blank indicates disengaged.

The first drive state shown in FIG. 7 is a drive state in the EV drive mode in which the vehicle 1 travels using the power from the third rotating electrical machine MGF in an EV(FF)_Hi mode, and is also a two-wheel drive state in which the power from the third rotating electrical machine MGF is transferred only to the front wheels 3. In the first drive state, the transfer 12 is set to the high speed-side shift stage Hi. In the first drive state, the stepped transmission unit 22 of the compound transmission 11 is set to neutral.

As shown in FIG. 9, when the transfer 12 is in the first drive state, the brake BF1 is in a disengaged state, the clutch CF1 is in an engaged state, the first dog clutch D1 is in a disengaged state, and the second dog clutch D2 is in a disengaged state. In the first drive state, the third planetary gear unit 64 is in a direct connection state in which the sun gear S3 and the carrier CA3 are connected by the clutch CF1. In the first drive state, when the power from the third rotating electrical machine MGF is transferred to the front wheel-side output shaft 62, the rotation of the third rotating electrical machine MGF is transferred to the front wheel-side output shaft 62 without being changed in speed by the third planetary gear unit 64.

Figure 10:
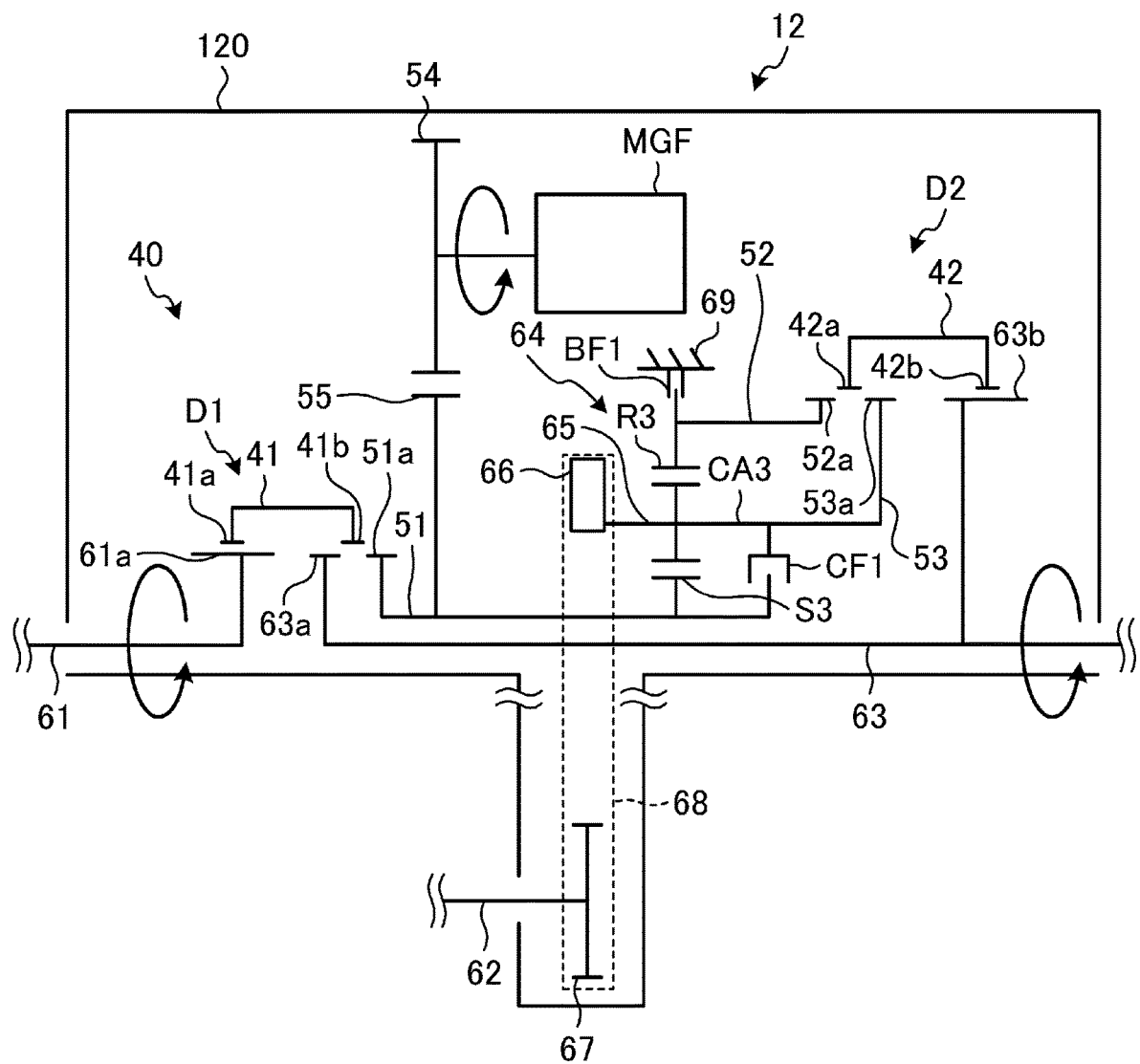
FIG. 10 is a skeleton diagram showing the case where the transfer is in a second drive state.

FIG. 10 is a skeleton diagram showing the case where the transfer 12 of the embodiment is in the second drive state. The second drive state is a drive state in the EV drive mode in which the vehicle 1 travels using the power from the third rotating electrical machine MGF in an EV(FF)_Lo mode, and is also the two-wheel drive state in which the power from the third rotating electrical machine MGF is transferred only to the front wheels 3. In the second drive state, the transfer 12 is set to the low speed-side shift stage Lo. In the second drive state, the stepped transmission unit 22 of the compound transmission 11 is set to neutral.

As shown in FIG. 9, when the transfer 12 is in the second drive state, the brake BF1 is in an engaged state, the clutch CF1 is in a disengaged state, the first dog clutch D1 is in a disengaged state, and the second dog clutch D2 is in a disengaged state. In the second drive state, the third planetary gear unit 64 is in a speed reduction state in which the ring gear R3 is mechanically held stationary with respect to the fixing member 69 by the brake BF1. In the second drive state, when the power from the third rotating electrical machine MGF is transferred to the front wheel-side output shaft 62, the rotation of the third rotating electrical machine MGF is transferred to the front wheel-side output shaft 62 after being reduced in speed by the third planetary gear unit 64.

Figure 11:
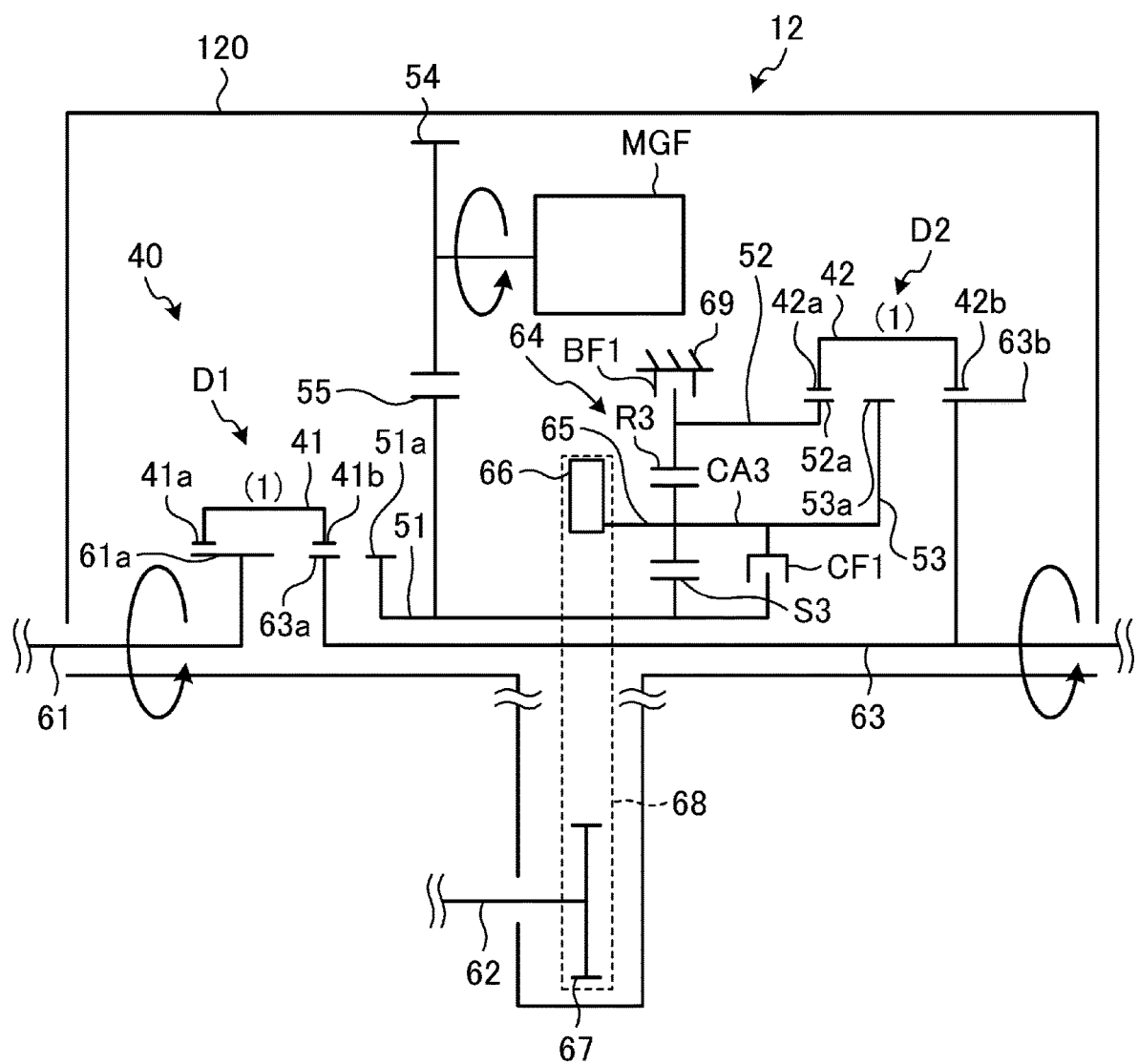
FIG. 11 is a skeleton diagram showing the case where the transfer is in a third drive state.

FIG. 11 is a skeleton diagram showing the case where the transfer 12 of the embodiment is in the third drive state. The third drive state is a drive state in a mode in which the power transferred to the transfer 12 in an H4_torque split mode is distributed toward the front wheels 3 and the rear wheels 4 to cause the vehicle 1 to travel, and is also a four-wheel drive state in which the power is transferred to the front wheels 3 and the rear wheels 4. In the third drive state, the torque distribution ratio at which the torque from the input shaft 61 is distributed to the front wheel-side output shaft 62 and the rear wheel-side output shaft 63 is changed by the MGF torque from the third rotating electrical machine MGF. In other words, the sun gear S3 of the third planetary gear unit 64 receives the torque transferred from the rear wheel-side output shaft 63 to the ring gear R3 of the third planetary gear unit 64 with the MGF torque from the third rotating electrical machine MGF as a reaction force. The torque transferred to the ring gear R3 is thus distributed toward the front wheels 3 and the rear wheels 4 at a desired ratio. In the third drive state, the transfer 12 is set to the high speed-side shift stage Hi.

As shown in FIG. 9, when the transfer 12 is in the third drive state, the brake BF1 is in a disengaged state, the clutch CF1 is in a disengaged state, the first dog clutch D1 is in the first input state, and the second dog clutch D2 is in the first transfer state. In FIG. 11, (1) in the first dog clutch D1 indicates that the first dog clutch D1 is in the first input state, and (1) in the second dog clutch D2 indicates that the second dog clutch D2 is in the first transfer state.

Figure 12:
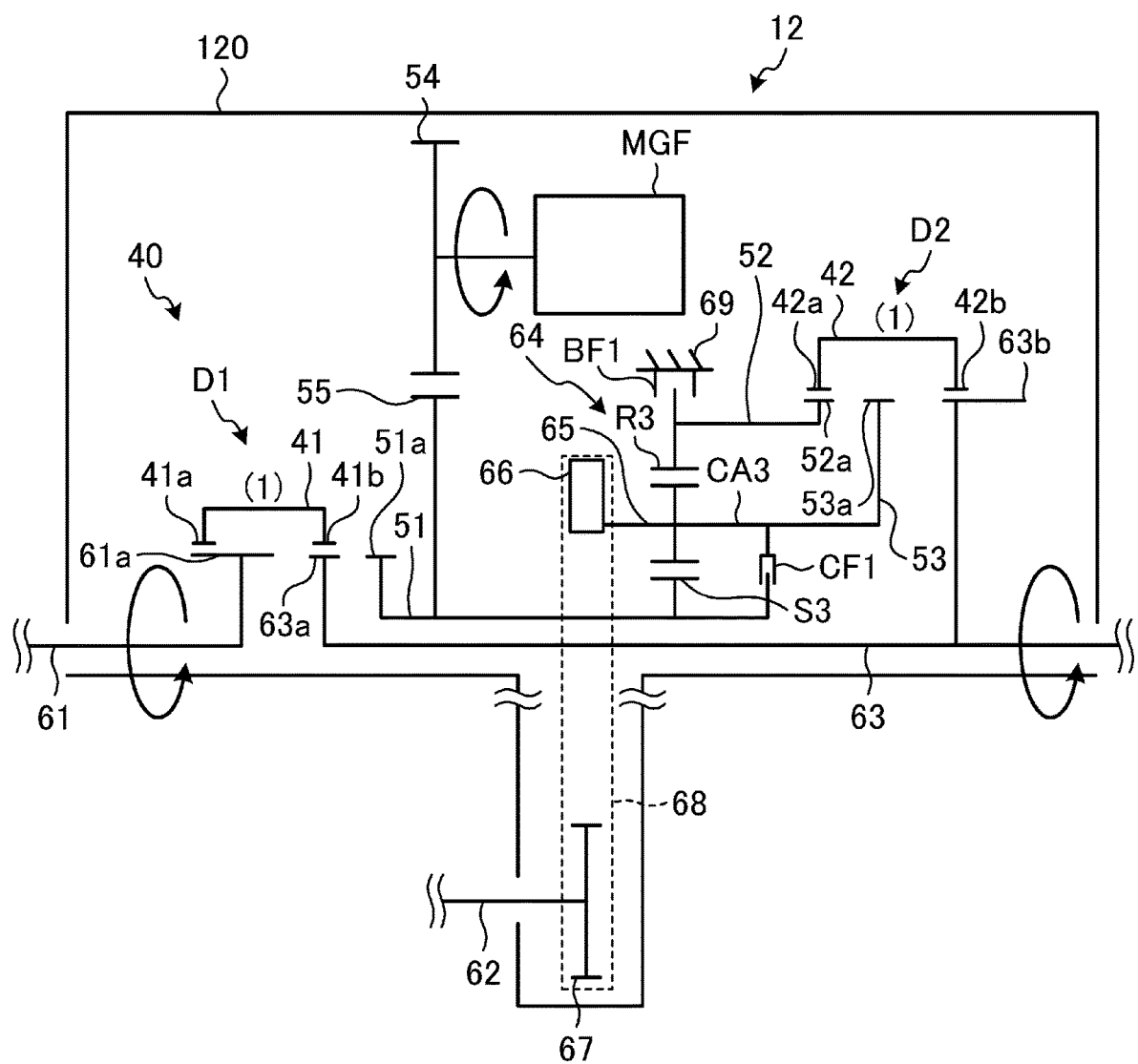
FIG. 12 is a skeleton diagram showing the case where the transfer is in a fourth drive state.

FIG. 12 is a skeleton diagram showing the case where the transfer 12 of the embodiment is in the fourth drive state. The fourth drive state is a drive state in a mode in which the power transferred to the transfer 12 in an H4_LSD mode is distributed toward the front wheels 3 and the rear wheels 4 to cause the vehicle 1 to travel, and is also the four-wheel drive state in which the power is transferred to the front wheels 3 and the rear wheels 4. The fourth drive state is a drive state in which differential rotation between the front wheel-side output shaft 62 and the rear wheel-side output shaft 63 is limited by engagement control of the clutch CF1. In the fourth drive state, the torque distribution ratio at which the torque from the input shaft 61 is distributed to the front wheel-side output shaft 62 and the rear wheel-side output shaft 63 is changed by engagement control of the clutch CF1. In the fourth drive state, the transfer 12 is set to the high speed-side shift stage Hi.

As shown in FIG. 9, when the transfer 12 is in the fourth drive state, the brake BF1 is in a disengaged state, the clutch CF1 is in an engagement control (half engaged) state, the first dog clutch D1 is in the first input state, and the second dog clutch D2 is in the first transfer state. In FIG. 12, (1) in the first dog clutch D1 in FIG. 12 indicates that the first dog clutch D1 is in the first input state, and (1) in the second dog clutch D2 indicates that the second dog clutch D2 is in the first transfer state.

Figure 13:
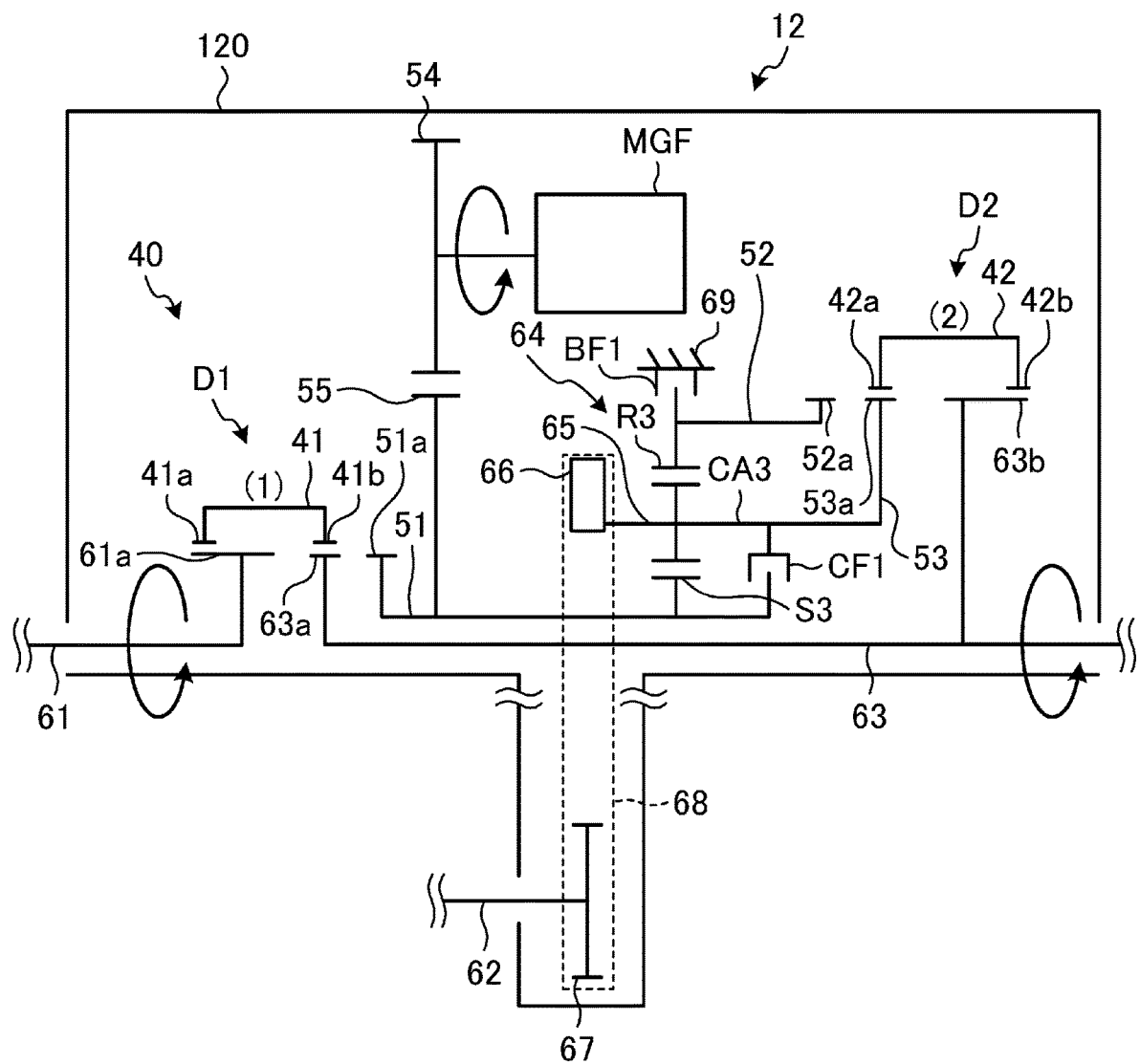
FIG. 13 is a skeleton diagram showing the case where the transfer is in a fifth drive state.

FIG. 13 is a skeleton diagram showing the case where the transfer 12 of the embodiment is in the fifth drive state. The fifth drive state is a drive state in a mode in which the power transferred to the transfer 12 in an H4_Lock mode (fixed distribution 4WD) is distributed toward the front wheels 3 and the rear wheels 4 to cause the vehicle 1 to travel, and is also the four-wheel drive state in which the power is transferred to the front wheels 3 and the rear wheels 4. The fifth drive state is a drive state in which the differential rotation between the front wheel-side output shaft 62 and the rear wheel-side output shaft 63 is disabled, and the torque distribution ratio at which the torque from the input shaft 61 is distributed to the front wheel-side output shaft 62 and the rear wheel-side output shaft 63 is fixed. In the fifth drive state, the transfer 12 is set to the high speed-side shift stage Hi.

As shown in FIG. 9, when the transfer 12 is in the fifth drive state, the brake BF1 is in a disengaged state, the clutch CF1 is in a disengaged state, the first dog clutch D1 is in the first input state, and the second dog clutch D2 is in the second transfer state. In FIG. 13, (1) in the first dog clutch D1 indicates that the first dog clutch D1 is in the first input state, and (2) in the second dog clutch D2 indicates that the second dog clutch D2 is in the second transfer state.

Figure 14:
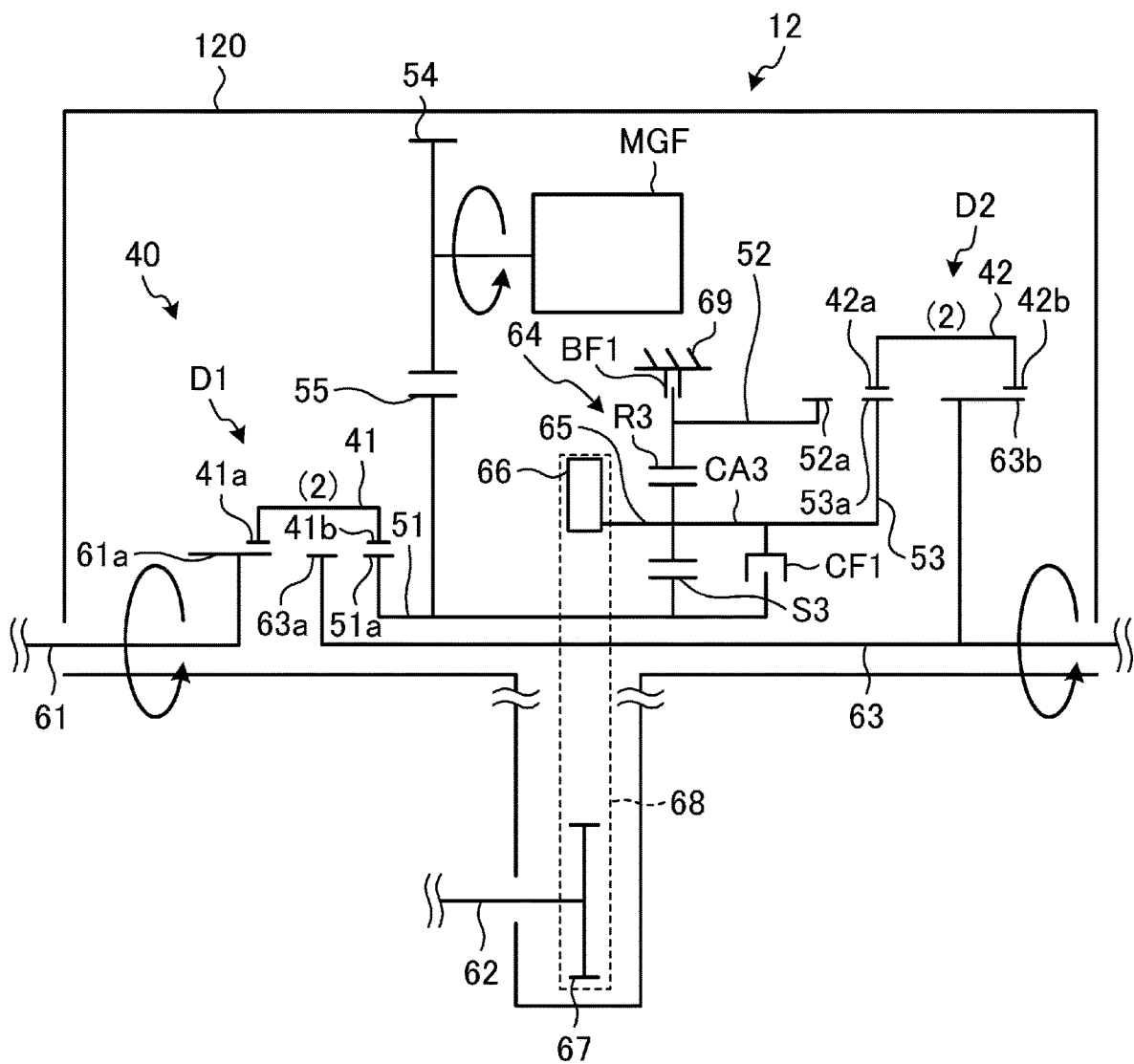
FIG. 14 is a skeleton diagram showing the case where the transfer is in a sixth drive state.

FIG. 14 is a skeleton diagram showing the case where the transfer 12 of the embodiment is in the sixth drive state. The sixth drive state is a drive state in a mode in which the power transferred to the transfer 12 in an L4_Lock mode (fixed distribution 4WD) is distributed toward the front wheels 3 and the rear wheels 4 to cause the vehicle 1 to travel, and is also the four-wheel drive state in which the power is transferred to the front wheels 3 and the rear wheels 4. The sixth drive state is a drive state in which the differential rotation between the front wheel-side output shaft 62 and the rear wheel-side output shaft 63 is disabled, and the torque distribution ratio at which the torque from the input shaft 61 is distributed to the front wheel-side output shaft 62 and the rear wheel-side output shaft 63 is fixed. In the sixth drive state, the transfer 12 is set to the low speed-side shift stage Lo.

As shown in FIG. 9, when the transfer 12 is in the sixth drive state, the brake BF1 is in an engaged state, the clutch CF1 is in a disengaged state, the first dog clutch D1 is in the second input state, and the second dog clutch D2 is in the second transfer state. In FIG. 14, (2) in the first dog clutch D1 indicates that the first dog clutch D1 is in the second input state, and (2) in the second dog clutch D2 indicates that the second dog clutch D2 is in the second transfer state.

In the transfer 12 of the embodiment, the drive state can be switched between the first drive state, the second drive state, the third drive state, and the fourth drive state according to the traveling state of the vehicle 1. Regarding the fifth drive state, the drive state can be switched between the fifth drive state and the third and fourth drive states as the driver turns on and off the Lock selection switch 92 provided in the vehicle 1. Regarding the sixth drive state, the drive state can be switched between the sixth drive state and the fifth drive state as the driver turns on and off the Low selection switch 90 provided in the vehicle 1 when the vehicle is stopped.

In order to switch the drive state of the transfer 12, the electronic control device 100 controls the hydraulic control circuit 111 by the transfer control device 104 based on output signals from various sensors mounted on the vehicle 1, the 4WD selection switch 86, the Low selection switch 90, etc., and controls the operating states of the actuators that operate the first dog clutch D1 and the second dog clutch D2, the brake BF1, and the clutch CF1.

The electronic control device 100 according to the embodiment perform regeneratively controls the second rotating electrical machine MG2 and the third rotating electrical machine MGF in such a manner that negative torque is applied to the front wheel-side output shaft 62 and the rear wheel-side output shaft 63, when performing regenerative control of the third rotating electrical machine MGF in a drive mode in which the torque from the first power source having the second rotating electrical machine MG2 is distributed to the front wheel-side output shaft 62 and the rear wheel-side output shaft 63 by controlling the MGF torque of the third rotating electrical machine MGF during deceleration of the vehicle 1, namely when performing regenerative control of the third rotating electrical machine MGF in the H4_torque split mode during deceleration of the vehicle 1. Negative torque can thus be applied to the front wheel-side output shaft 62 and the rear wheel-side output shaft 63 while performing regenerative control of the third rotating electrical machine MGF during deceleration of the vehicle 1.

The electronic control device 100 according to the embodiment regeneratively controls the second rotating electrical machine MG2 and the third rotating electrical machine MGF during deceleration of the vehicle 1 so that the braking force distribution ratio between the front wheels 3 and the rear wheels 4 becomes an ideal distribution ratio that is a target braking force distribution ratio. Appropriate braking forces can thus be applied to the front wheels 3 and the rear wheels 4.

Figure 15:
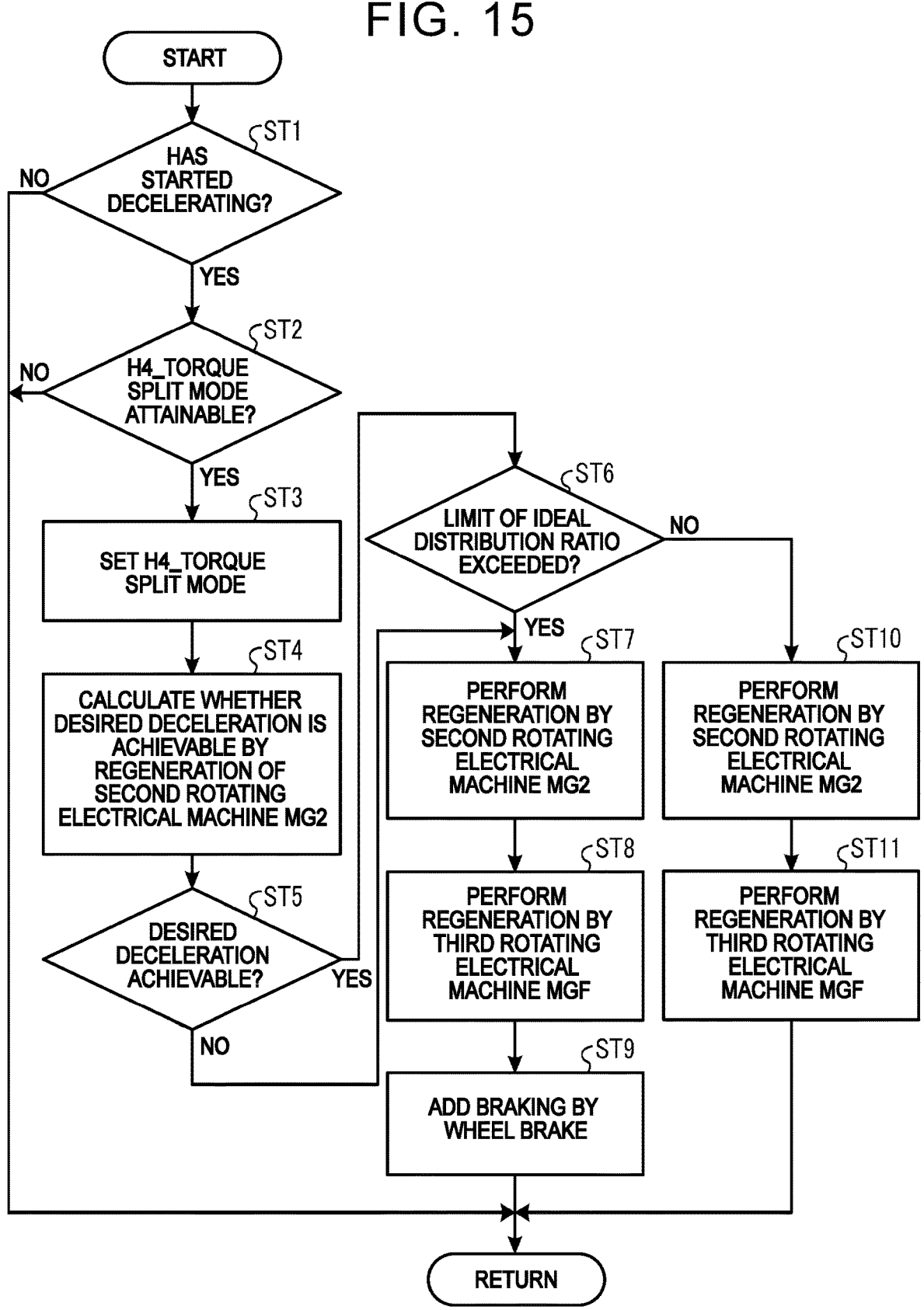
FIG. 15 is a flowchart showing an example of control that is performed by an electronic control device provided in the vehicle drive device.
Figure 16:
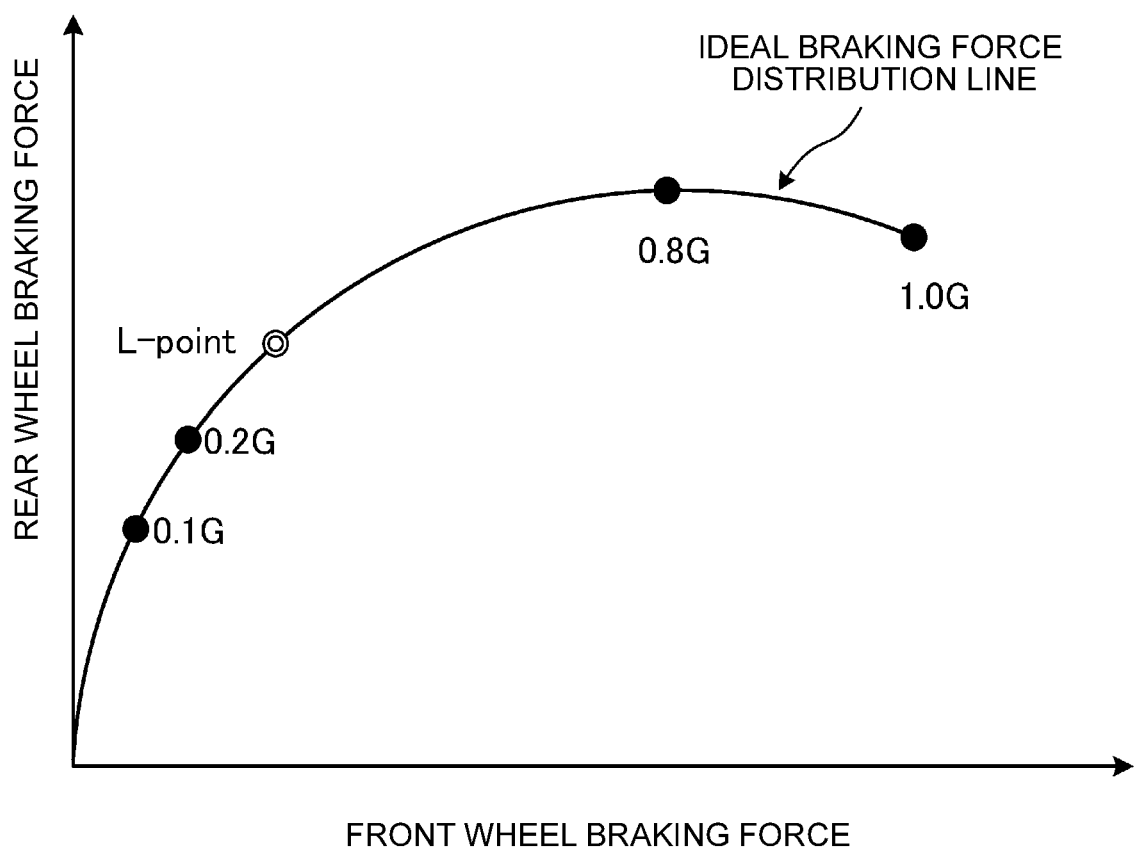
FIG. 16 shows an example of a map of braking force distribution between front wheels and rear wheels of the vehicle.

FIG. 15 is a flowchart showing an example of control that is performed by the electronic control device 100 according to the embodiment. FIG. 16 shows an example of a map of braking force distribution between the front wheels 3 and the rear wheels 4. In FIG. 16, the abscissa represents the front wheel braking force, and the ordinate represents the rear wheel braking force. A continuous line in FIG. 16 is an ideal braking force distribution line showing ideal braking force distribution between the front wheels 3 and the rear wheels 4. As shown in FIG. 16, as target deceleration increases from 0.1 G to 0.8 G, the braking force distribution is controlled by following the ideal braking force distribution line shown by the continuous line in FIG. 16 in the direction toward the upper right. In other words, the target braking force distribution ratio between the front wheels 3 and the rear wheels 4 is determined so that the front wheel braking force and the rear wheel braking force change along the ideal braking force distribution line. That is, the target braking force distribution ratio is set according to the target deceleration. L-point in FIG. 16 is a limit point at which the braking force distribution ratio can be controlled to the target braking force distribution ratio by regenerative control by the second rotating electrical machine MG2 and the third rotating electrical machine MGF. That is, as shown in FIG. 16, as the target deceleration changes from 0.1 G toward 0.8 G, the sharing ratio of the braking force on the front wheels 3 (braking force distribution ratio of the front wheels 3) is increased, but there is a limit to increasing the sharing ratio of the braking force on the front wheels 3 only by the regenerative control of the second rotating electrical machine MG2 and the third rotating electrical machine MGF. The limit point is the point at which the sharing ratio of the braking force on the front wheels 3 can no longer be increased.

As shown in FIG. 15, the electronic control device 100 determines in step ST1 whether the vehicle 1 has started decelerating. When the electronic control device 100 determines that the vehicle 1 has not started decelerating (No in step ST1), the electronic control device 100 returns this control. When the electronic control device 100 determines that the vehicle 1 has started decelerating (Yes in step ST1), the electronic control device 100 determines in step ST2 whether the H4_torque split mode is attainable. The H4_torque split mode is not attainable, for example, when the third rotating electrical machine MGF fails.

When the electronic control device 100 determines that the H4_torque split mode is not attainable (No in step ST2), the electronic control device 100 returns this control. When the electronic control device 100 determines that the H4_torque split mode is attainable (Yes in step ST2), the electronic control device 100 sets the H4_torque split mode in step ST3.

Next, the electronic control device 100 calculates in step ST4 whether target deceleration is achievable by regenerative control of the second rotating electrical machine MG2. That is, the electronic control device 100 calculates the amount of regeneration of the second rotating electrical machine MG2 that is required to achieve the target deceleration. The target deceleration is determined by the accelerator operation amount, the amount of depression of the brake pedal, the deceleration setting by the user, etc. The amount of regeneration of the second rotating electrical machine MG2 is determined by the rotational speed and torque of the second rotating electrical machine MG2 at that time. The amount of regeneration of the second rotating electrical machine MG2 may be calculated in view of engine braking.

Thereafter, the electronic control device 100 determines in step ST5 whether the target deceleration is achievable based on the calculation result in step ST4. That is, the electronic control device 100 determines whether the amount of regeneration that can be realized by the second rotating electrical machine MG2 is equal to or greater than the amount of regeneration of the second rotating electrical machine MG2 that is required to achieve the target deceleration. When the second rotating electrical machine MG2 can be used as specified in the specifications, the amount of regeneration that can be realized by the second rotating electrical machine MG2 is calculated from the values as specified in the specifications. For example, when a load factor limit is applied to the operation of the second rotating electrical machine MG2, the electronic control device 100 calculates in view of the load factor limit the amount of regeneration that can be realized by the second rotating electrical machine MG2, and determines whether the target deceleration is achievable. When the SOC of the battery is equal to or higher than a predetermined SOC value and the charging amount of the battery is limited, the electronic control device 100 calculates in view of the limit on the charging amount of the battery the amount of regeneration that can be realized by the second rotating electrical machine MG2, and determines whether the target deceleration is achievable.

When the electronic control device 100 determines that the target deceleration is achievable (Yes in step ST5), the electronic control device 100 determines in step ST6 whether the limit of the ideal distribution ratio is exceeded. That is, the electronic control device 100 determines whether the target deceleration is greater than the limit point. When decelerating the vehicle 1, it is aimed to recover as much energy as possible by regenerative control of the second rotating electrical machine MG2. For example, when the vehicle 1 is decelerated by the wheel brake 106, there will be a loss in recovered energy. Such a loss should be avoided as much as possible. However, when the deceleration continues to be output by the regenerative control of the second rotating electrical machine MG2, the sharing ratio of the braking force on the rear wheels 4 becomes too high with respect to the ideal braking force distribution line shown by the continuous line in FIG. 16. This should be avoided.

When the electronic control device 100 determines that the limit of the ideal distribution ratio is exceeded (Yes in step ST6), the electronic control device 100 performs regenerative control of the second rotating electrical machine MG2 in step ST7. Subsequently, the electronic control device 100 performs regenerative control of the third rotating electrical machine MGF in step ST8.

Thereafter, the electronic control device 100 adds braking by the wheel brake 106 in step ST9. That is, when the braking force distribution ratio is not controllable to the target braking force distribution ratio by the regenerative control of the second rotating electrical machine MG2 and the third rotating electrical machine MGF, the electronic control device 100 controls the braking force distribution ratio to the target braking force distribution ratio by covering by the wheel brake 106 the shortage of the braking force obtained by the regenerative control of the second rotating electrical machine MG2 and the third rotating electrical machine MGF with respect to the braking forces required for the front wheels 3 and the rear wheels 4.

The electronic control device 100 returns this control after step ST9.

When the electronic control device 100 determines in step ST6 that the limit of the ideal distribution ratio is not exceeded (No in step ST6), the electronic control device 100 performs regenerative control of the second rotating electrical machine MG2 in step ST10. In this case, the energy during deceleration of the vehicle 1 can be recovered only by the second rotating electrical machine MG2.

Subsequently, the electronic control device 100 performs regenerative control of the third rotating electrical machine MGF in step ST11. The electronic control device 100 returns this control after step ST11.

When the electronic control device 100 determines in step ST5 that the target deceleration is not achievable (No in step ST5), the electronic control device 100 performs regenerative control of the second rotating electrical machine MG2 in step ST7. The electronic control device 100 then performs regenerative control of the third rotating electrical machine MGF in step ST8. Thereafter, the electronic control device 100 adds braking by the wheel brake 106 in step ST9. That is, when the target deceleration is not achievable by the regenerative control of the second rotating electrical machine MG2 and the third rotating electrical machine MGF due to limitation on the amount of regeneration of the second rotating electrical machine MG2, the electronic control device 100 adds braking by the wheel brake 106 so as to cover the shortage of the deceleration by the wheel brake 106. In this case as well, the electronic control device 100 controls the braking force distribution ratio to the target braking force distribution ratio by covering by the wheel brake 106 the shortage of the braking force obtained by the regenerative control of the second rotating electrical machine MG2 and the third rotating electrical machine MGF with respect to the braking forces required for the front wheels 3 and the rear wheels 4. The electronic control device 100 returns this control after step ST9.

As described above, when the electronic control device 100 performs regenerative control of the third rotating electrical machine MGF in the H4_torque split mode during deceleration of the vehicle 1, the electronic control device 100 performs regenerative control of the second rotating electrical machine MG2 and the third rotating electrical machine MGF so that negative torque is applied to the front wheel-side output shaft 62 and the rear wheel-side output shaft 63. Negative torque can thus be applied to the front wheel-side output shaft 62 and the rear wheel-side output shaft 63 while performing regenerative control of the third rotating electrical machine MGF during deceleration of the vehicle 1.

The electronic control device 100 regeneratively controls the second rotating electrical machine MG2 and the third rotating electrical machine MGF during deceleration of the vehicle 1 so that the braking force distribution ratio between the front wheels 3 and the rear wheels 4 becomes the ideal distribution ratio that is the target braking force distribution ratio. Appropriate braking forces can thus be applied to the front wheels 3 and the rear wheels 4.

In the embodiment, the transfer 12 includes the first dog clutch D1 in order to set the L4_Lock mode. However, the first dog clutch D1 may be omitted when the L4_Lock mode is not set. In this case, the input shaft 61 is constantly connected to the rear wheel-side output shaft 63.

In the embodiment, the transfer 12 includes the clutch CF1 and the brake BF1. However, either or both of the clutch CF1 and the brake BF1 may be omitted.

In the embodiment, the clutch CF1 engages the carrier CA3 with the sun gear S3. However, the clutch CF1 may engage the carrier CA3 with the ring gear R3, or may engage the sun gear S3 with the ring gear R3.

In the embodiment, the first power source has the engine 2. However, the engine 2 may be omitted. In this case, the vehicle 1 is an electric vehicle.

What is claimed is:

1. A vehicle drive device, comprising:
a power source including a first rotating electrical machine (MG2);
a second rotating electrical machine (MGF);
a first output shaft (63) connected to the power source (MG2) and configured to output power to one of a front wheel (front wheel 3) and a rear wheel (rear wheel 4);
a second output shaft (62) configured to output power to another of the front wheel (front wheel 3) and the rear wheel (rear wheel 4);
a planetary gear (64) including a ring gear (R3) connected to the first output shaft (63), a carrier (CA3) connected to the second output shaft (62), and a sun gear (S3) connected to the second rotating electrical machine (MGF); and
a processor and memory programmed to regeneratively control the first rotating electrical machine and the second rotating electrical machine in such a manner that negative torque is applied to the first output shaft and the second output shaft, when performing regenerative control of the second rotating electrical machine in a drive mode in which torque from the power source is distributed to the first output shaft and the second output shaft by controlling torque of the second rotating electrical machine during deceleration of a vehicle equipped with the vehicle drive device.

2. The vehicle drive device according to claim 1, wherein the processor and memory are programmed to regeneratively control the first rotating electrical machine and the second rotating electrical machine in such a manner that a braking force distribution ratio between the front wheel and the rear wheel becomes a target braking force distribution ratio during deceleration of the vehicle.

3. The vehicle drive device according to claim 2, wherein the processor and memory are programmed to, when the braking force distribution ratio is not controllable to the target braking force distribution ratio by the regenerative control of the first rotating electrical machine and the second rotating electrical machine during deceleration of the vehicle, control the braking force distribution ratio to the target braking force distribution ratio by using a wheel brake to cover a shortage of a braking force obtained by the regenerative control of the first rotating electrical machine and the second rotating electrical machine with respect to braking forces required for the front wheel and the rear wheel.

4. The vehicle drive device according to claim 2, wherein the processor and memory are programmed to set the target braking force distribution ratio according to target deceleration.

5. The vehicle drive device according to claim 1, wherein the processor and memory are programmed to cover a shortage of deceleration by a wheel brake when target deceleration is not achievable by the regenerative control of the first rotating electrical machine and the second rotating electrical machine due to limitation on an amount of regeneration of the first rotating electrical machine.

6. A control method for a vehicle drive device, the vehicle drive device including
a power source including a first rotating electrical machine (MG2),
a second rotating electrical machine (MGF),
a first output shaft (63) connected to the power source (MG2) and configured to output power to one of a front wheel (front wheel 3) and a rear wheel (rear wheel 4),
a second output shaft (62) configured to output power to another of the front wheel (front wheel 3) and the rear wheel (rear wheel 4), and
a planetary gear (64) including a ring gear (R3) connected to the first output shaft (63), a carrier (CA3) connected to the second output shaft (62), and a sun gear (S3) to the second rotating electrical machine (MGF), the control method comprising regeneratively controlling the first rotating electrical machine and the second rotating electrical machine in such a manner that negative torque is applied to the first output shaft and the second output shaft, when performing regenerative control by the second rotating electrical machine in a drive mode in which torque from the power source is distributed to the first output shaft and the second output shaft by controlling torque of the second rotating electrical machine during deceleration of a vehicle equipped with the vehicle drive device.

\* \* \* \* \*